US012666496B2

(12) United States Patent
Hori et al.

(10) Patent No.: US 12,666,496 B2
(45) Date of Patent: Jun. 23, 2026

(54) TERMINAL APPARATUS, BASE STATION APPARATUS, AND METHOD

(71) Applicant: SHARP KABUSHIKI KAISHA, Sakai City (JP)

(72) Inventors: Takako Hori, Sakai City (JP); Shohei Yamada, Sakai City (JP); Hidekazu Tsuboi, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 473 days.

(21) Appl. No.: 18/019,243

(22) PCT Filed: Aug. 2, 2021

(86) PCT No.: PCT/JP2021/028601
§ 371 (c)(1),
(2) Date: Feb. 2, 2023

(87) PCT Pub. No.: WO2022/030441
PCT Pub. Date: Feb. 10, 2022

(65) Prior Publication Data
US 2023/0309185 A1    Sep. 28, 2023

(30) Foreign Application Priority Data

Aug. 4, 2020    (JP) ................................. 2020-132233

(51) Int. Cl.
*H04W 76/30*    (2018.01)
*H04W 4/06*    (2009.01)
*H04W 72/20*    (2023.01)
*H04W 76/20*    (2018.01)

(52) U.S. Cl.
CPC ............. *H04W 76/30* (2018.02); *H04W 4/06* (2013.01); *H04W 72/20* (2023.01); *H04W 76/20* (2018.02)

(58) Field of Classification Search
None
See application file for complete search history.

(56) References Cited

U.S. PATENT DOCUMENTS 8,068,843 B2 * 11/2011 Yi ......................... H04W 72/30
                                                        455/435.2
2009/0270026 A1    10/2009 Shin et al.
2010/0254360 A1    10/2010 Ueda et al.
(Continued)

FOREIGN PATENT DOCUMENTS

CN        101039513 A        9/2007
CN     202010325310      *   4/2020
(Continued)

OTHER PUBLICATIONS

Author Unknown, KIKI7, new solution mode switching between unicast and multicast, pp. 1-3, Doc. No. S2-2004508, Jun. 12 (Year: 2020).*

(Continued)

*Primary Examiner* — Christopher M Crutchfield
(74) *Attorney, Agent, or Firm* — ScienBiziP, P.C.

(57) ABSTRACT

Provided is a terminal apparatus configured to release, based on receiving, via a DCCH from the base station apparatus, an RRC message including a part of session information of an MBS session, an MBS radio bearer used to receive the MBS session.

3 Claims, 13 Drawing Sheets

(56) References Cited

U.S. PATENT DOCUMENTS

| | | | |
|---|---|---|---|
| 2016/0249266 A1 | 8/2016 | Kim et al. | |
| 2023/0018697 A1* | 1/2023 | Zhang | H04W 24/08 |
| 2023/0030347 A1* | 2/2023 | Kim | H04L 67/148 |
| 2023/0039646 A1* | 2/2023 | Zhang | H04L 1/08 |
| 2023/0044962 A1* | 2/2023 | Kim | H04W 76/40 |
| 2023/0180349 A1* | 6/2023 | Zhu | H04W 4/06 |
| | | | 370/312 |
| 2023/0199569 A1* | 6/2023 | Cao | H04W 4/06 |
| | | | 370/331 |

FOREIGN PATENT DOCUMENTS

| | | | |
|---|---|---|---|
| CN | 202010345823 | * | 4/2020 |
| WO | 2004/102831 A1 | | 11/2004 |
| WO | WO 2021/237526 A1 * | | 5/2020 |
| WO | PCT/CN2021/085203 | * | 5/2021 |

OTHER PUBLICATIONS

Author Unknown, KI #7, New Sol: Mode switch between multicast and unicast, Doc. No. S2-2004330, pp. 1-12, Jun. 12 (Year: 2020).*

Author Unknown, KI #7, New Sol: Mode switch between multicast and unicast, Doc. No. S2-2004106, pp. 1-7, Jun. 12 (Year: 2020).*

Author Unknown, KI7, new solution mode switching between unicast and multicast, Doc. No. S2-2003961, pp. 1-3, Jun. 12 (Year: 2020).*

Author Unknown, Solution for multicast and unicast switching, Doc S2-2003859, pp. 1-3, Jun. 12 (Year: 2020).*

NEC, "ROHC and ciphering for SC-PTM", R2-156616, 3GPP TSG RAN WG2 Meeting #92, Anaheim, USA, Nov. 16, 2015-Nov. 20, 2015, [retrieved on Nov. 16, 2015].

TD Tech et al., "Adding the MBMS PTM RB release cause in the MCCH message when releasing the MBMS service for 1.28Mcps TDD.", R2-091515, 3GPP TSG-RAN WG2 #65, Athens, Greece, Feb. 9, 2009-Feb. 13, 2009, [retrieved on Feb. 9, 2009].

Huawei, "New Work Item on NR support of Multicast and Broadcast Services", RP-193248, (revision of RP-193163), 3GPP TSG RAN Meeting #86, Sitges, Spain, Dec. 9-12, 2019.

3GPP TS 23.501 V16.5.0 (Jul. 2020) 3rd Generation Partnership Project; Technical Specification Group Services and System Aspects; System architecture for the 5G System (5GS); Stage 2 (Release 16).

3GPP TS 36.300 V16.2.0 (Jul. 2020) 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16).

3GPP TS 36.331 V16.1.0 (Jul. 2020) 3rd Generation Partnership Project; Technical Specification Group Radio Access Network; Evolved Universal Terrestrial Radio Access (E-UTRA); Radio Resource Control (RRC); Protocol specification (Release 16).

3GPP TS 36.323 V16.1.0 (Jul. 2020) 3rd Generation Partnership Project; Technical Specification Group Radio Access Network; Evolved Universal Terrestrial Radio Access (E-UTRA); Packet Data Convergence Protocol (PDCP) specification (Release 16).

3GPP TS 36.322 V16.0.0 (Jul. 2020) 3rd Generation Partnership Project; Technical Specification Group Radio Access Network; Evolved Universal Terrestrial Radio Access (E-UTRA); Radio Link Control (RLC) protocol specification (Release 16).

3GPP TS 36.321 V16.1.0 (Jul. 2020) 3rd Generation Partnership Project; Technical Specification Group Radio Access Network; Evolved Universal Terrestrial Radio Access (E-UTRA); Medium Access Control (MAC) protocol specification (Release 16).

3GPP TS 37.340 V16.2.0 (Jul. 2020) 3rd Generation Partnership Project; Technical Specification Group Radio Access Network; Evolved Universal Terrestrial Radio Access (E-UTRA) and NR; Multi-connectivity; Stage 2 (Release 16).

3GPP TS 38.300 V16.2.0 (Jul. 2020) 3rd Generation Partnership Project; Technical Specification Group Radio Access Network; NR; NR and NG-RAN Overall Description; Stage 2 (Release 16).

3GPP TS 38.331 V16.1.0 (Jul. 2020) 3rd Generation Partnership Project; Technical Specification Group Radio Access Network; NR; Radio Resource Control (RRC) protocol specification (Release 16).

3GPP TS 38.323 V16.1.0 (Jul. 2020) 3rd Generation Partnership Project; Technical Specification Group Radio Access Network; NR; Packet Data Convergence Protocol (PDCP) specification (Release 16).

3GPP TS 38.322 V16.1.0 (Jul. 2020) 3rd Generation Partnership Project; Technical Specification Group Radio Access Network; NR; Radio Link Control (RLC) protocol specification (Release 16).

3GPP TS 38.321 V16.1.0 (Jul. 2020) 3rd Generation Partnership Project; Technical Specification Group Radio Access Network; NR; Medium Access Control (MAC) protocol specification (Release 16).

3GPP TS 23.401 V16.7.0 (Jul. 2020) 3rd Generation Partnership Project; Technical Specification Group Services and System Aspects; General Packet Radio Service (GPRS) enhancements for Evolved Universal Terrestrial Radio Access Network (E-UTRAN) access (Release 16).

3GPP TS 26.346 V15.5.0 (Jun. 2020) 3rd Generation Partnership Project; Technical Specification Group Services and System Aspects; Multimedia Broadcast/Multicast Service (MBMS); Protocols and codecs (Release 15).

3GPP TS 37.324 V16.1.0 (Jul. 2020) 3rd Generation Partnership Project; Technical Specification Group Radio Access Network; E-UTRA and NR; Service Data Adaptation Protocol (SDAP) specification (Release 16).

* cited by examiner

```
RadioBearerConfig ::=          SEQUENCE {
    <PARTLY OMITTED>
    srb-ToAddModList              SRB-ToAddModList        OPTIONAL,
    drb-ToAddModList              DRB-ToAddModList        OPTIONAL,
    drb-ToReleaseList             DRB-ToReleaseList       OPTIONAL
    <PARTLY OMITTED>
}

SRB-ToAddModList ::=   SEQUENCE (SIZE (1..2)) OF SRB-ToAddMod
SRB-ToAddMod ::=          SEQUENCE {
    srb-Identity              SRB-Identity,
    <PARTLY OMITTED>
    pdcp-Config                                 OPTIONAL,      -- Cond PDCP
    ...
}

DRB-ToAddModList ::=   SEQUENCE (SIZE (1..maxDRB)) OF DRB-ToAddMod
DRB-ToAddMod ::=          SEQUENCE {
    cnAssociation             CHOICE {
        eps-BearerIdentity        INTEGER (0..15),        -- EPS-DRB-Setup
        sdap-Config               SDAP-Config             -- 5GC
    }                             OPTIONAL, -- Cond DRBSetup
    drb-Identity              DRB-Identity,
    <PARTLY OMITTED>
    pdcp-Config                                 OPTIONAL,      -- Cond PDCP
    ...
}

DRB-ToReleaseList ::=   SEQUENCE (SIZE (1..maxDRB)) OF DRB-Identity
DRB-Identity ::=          INTEGER (1..32)
SDAP-Config ::=           SEQUENCE {
    <PARTLY OMITTED>
    pdu-Session               PDU-SessionID,
    mappedQoS-FlowsToAdd      SEQUENCE (SIZE (1..maxNrofQFIs)) OF QFI
    mappedQoS-FlowsToRelease  SEQUENCE (SIZE (1..maxNrofQFIs)) OF QFI
    ...
}
```

FIG. 7

```
<OMITTED>
RadioResourceConfigDedicated ::=     SEQUENCE [
    <PARTLY OMITTED>
    srb-ToAddModList            SRB-ToAddModList    ,
    drb-ToAddModList            DRB-ToAddModList,
    drb-ToReleaseList           SEQUENCE (SIZE (1..maxDRB)) OF DRB-Identity,
    <PARTLY OMITTED>
]

SRB-ToAddModList ::= SEQUENCE (size (1..2)) OF SRB-ToAddMod
SRB-ToAddMod ::= SEQUENCE [
    <PARTLY OMITTED>
    srb-Identity        INTEGER (1..2),
    pdcp-Config         PDCP-Config                 OPTIONAL,
    <PARTLY OMITTED>
]

DRB-ToAddModList ::= SEQUENCE (size (1..maxQoSFlowID)) OF DRB-ToAddMod
DRB-ToAddMod ::= SEQUENCE [
    <PARTLY OMITTED>
    eps-BearerIdentity      INTEGER (0..15)         OPTIONAL,
    drb-Identity            DRB-Identity,
    pdcp-Config             PDCP-Config             OPTIONAL,
    <PARTLY OMITTED>
]

DRB-Identity ::=        INTEGER (1..32)
    <OMITTED>
```

FIG. 8

```
SystemInformationBlockType20-r13 ::= SEQUENCE {
    sc-mcch-RepetitionPeriod-r13      ENUMERATED {rf2, rf4, rf8, rf16, rf32, rf64, rf128, rf256},
    sc-mcch-Offset-r13                INTEGER (0..10),
    sc-mcch-FirstSubframe-r13         INTEGER (0..9),
    sc-mcch-duration-r13              INTEGER (2..9) OPTIONAL,
    sc-mcch-ModificationPeriod-r13    ENUMERATED {rf2, rf4, rf8, rf16, rf32, rf64, rf128, rf256,
                                      rf512, rf1024, r2048, rf4096, rf8192, rf16384, rf32768,
                                      rf65536},
    <OMITTED>
}
```

FIG. 10

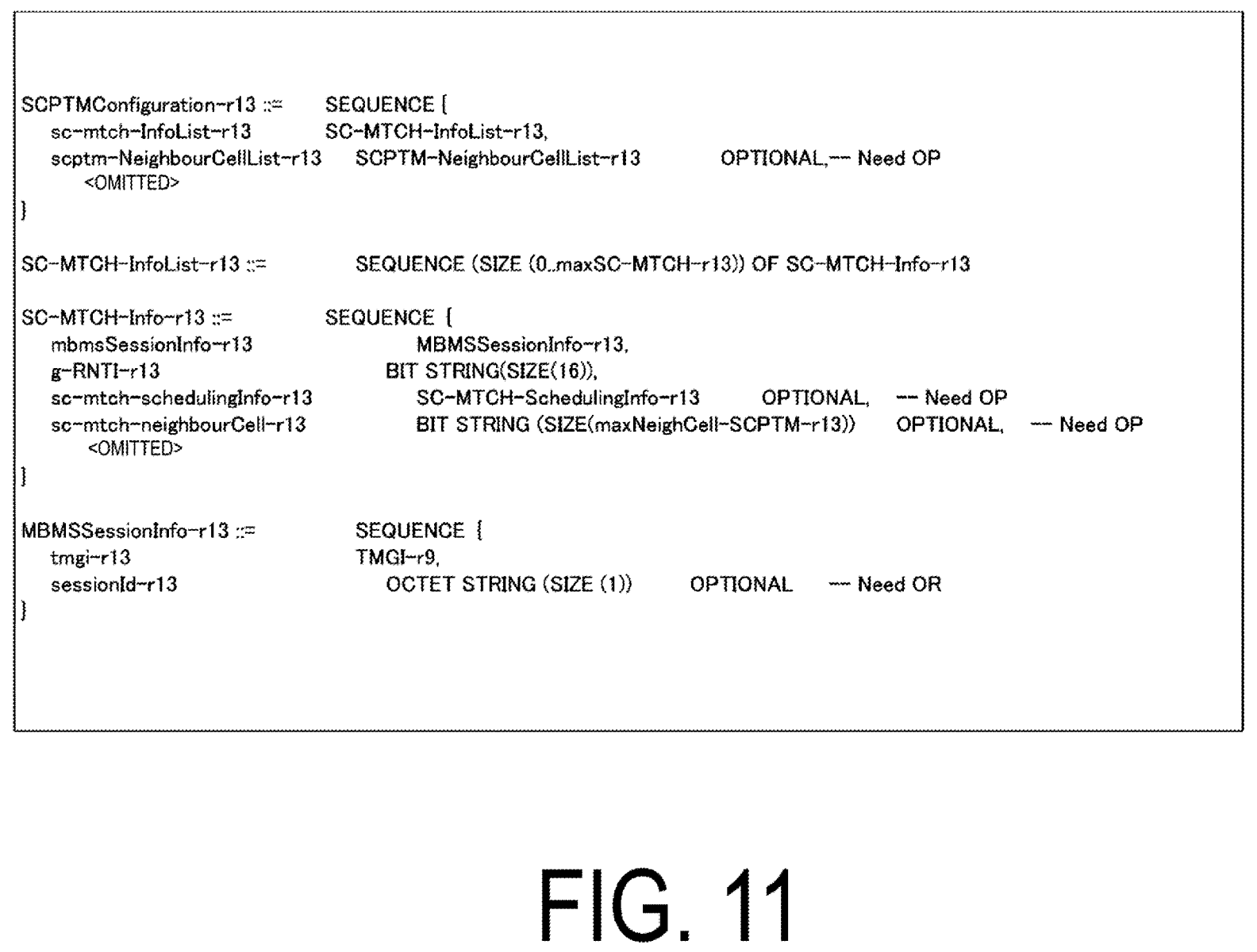

```
SCPTMConfiguration-r13 ::=       SEQUENCE {
sc-mtch-InfoList-r13              SC-MTCH-InfoList-r13,
sptm-NeighbourCellList-r13        SCPTM-NeighbourCellList-r13         OPTIONAL, -- Need OP
    <OMITTED>
}

SC-MTCH-InfoList-r13 ::=          SEQUENCE (SIZE (0..maxSC-MTCH-r13)) OF SC-MTCH-Info-r13

SC-MTCH-Info-r13 ::=             SEQUENCE {
mbmsSessionInfo-r13               MBMSSessionInfo-r13,
g-RNTI-r13                        BIT STRING(SIZE(16)),
sc-mtch-schedulingInfo-r13        SC-MTCH-SchedulingInfo-r13         OPTIONAL,   -- Need OP
sc-mtch-neighbourCell-r13         BIT STRING (SIZE(maxNeighCell-SCPTM-r13))   OPTIONAL,   -- Need OP
    <OMITTED>
}

MBMSSessionInfo-r13 ::=          SEQUENCE {
tmgi-r13                          TMGI-r9,
sessionId-r13                     OCTET STRING (SIZE (1))            OPTIONAL      -- Need OR
}
```

FIG. 11

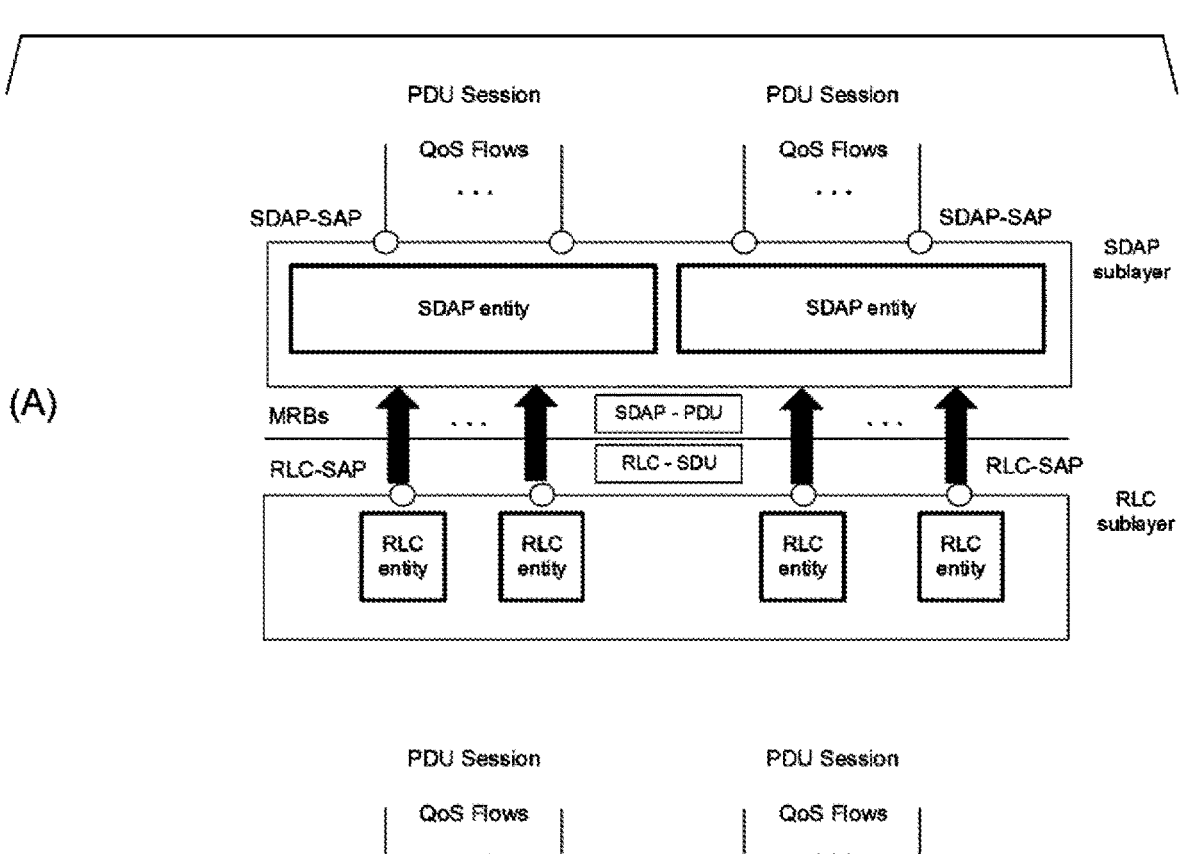
(A)
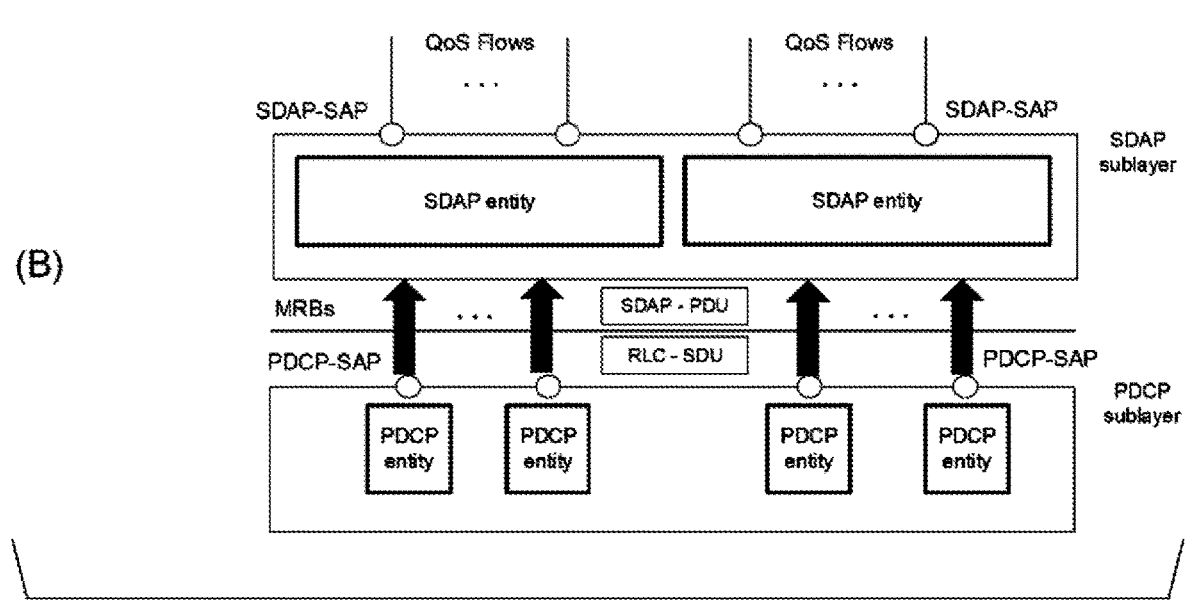
(B)
FIG. 12

TERMINAL APPARATUS, BASE STATION APPARATUS, AND METHOD

TECHNICAL FIELD

The present invention relates to a terminal apparatus, a base station apparatus, and a method.

This application claims priority based on JP 2020-132233 filed on Aug. 4, 2020, the contents of which are incorporated herein by reference.

BACKGROUND ART

In the 3rd Generation Partnership Project (3GPP) which is a standardization project for cellular mobile communication systems, technical study and standardization have been performed on the cellular mobile communication systems including radio access, core networks, services, and the like.

For example, in 3GPP, technical study and standardization have been started on Evolved Universal Terrestrial Radio Access (E-UTRA) as a radio access technology (RAT) for cellular mobile communication systems for the 3.9th generation and the 4th generation. At present as well, in 3GPP, technical study and standardization have been carried out on enhanced technology of E-UTRA. Note that E-UTRA may also be referred to as Long Term Evolution (LTE: registered trademark), and its enhanced technology may also be referred to as LTE-Advanced (LTE-A) and LTE-Advanced Pro (LTE-A Pro).

In 3GPP, technical study and standardization have been started on New Radio or NR. Radio access (NR) as a radio access technology (RAT) for cellular mobile communication systems for the 5th generation (5G). At present as well, in 3GPP, technical study and standardization have been carried out on enhanced technology of NR.

CITATION LIST

Non Patent Literature

NPL 1: 3GPP RP-193248, "New Work Item on NR Multicast and Broadcast Services"

NPL 2: 3GPP TS 23.501 v16.5.0, "System Architecture for the 5G System; Stage 2"

NPL 3: 3GPP TS 36.300 v16.2.0, "Evolved Universal Terestrial Radio Access (E-UTRA) and Evolved Universal Terrestrial Radio Access Network (E-UTRAN); Overall description; Stage 2"

NPL 4: 3GPP TS 36.331 v16.1.0, "Evolved Universal Terrestrial Radio Access (E-UTRA); Radio Resource Control (RRC); Protocol specifications"

NPL 5: 3GPP TS 36.323 v16.1.0, "Evolved Universal Terrestrial Radio Access (E-UTRA); Packet Data Convergence Protocol (PDCP) specification"

NPL 6: 3GPP TS 36.322 v16.0.0, "Evolved Universal Terrestrial Radio Access (E-UTRA); Radio Link Control (RLC) protocol specification"

NPL 7: 3GPP TS 36.321 v16.1.0, "Evolved Universal Terrestrial Radio Access (E-UTRA); Medium Access Control (MAC) protocol specification"

NPL 8: 3GPP TS 37.340v16.2.0, "Evolved Universal Terrestrial Radio Access (E-UTRA) and NR; Multi-Connectivity; Stage 2"

NPL 9: 3GPP TS 38.300v16.2.0, "NR; NR and NG-RAN Overall description; Stage 2"

NPL 10: 3GPP TS 38.331 v16.1.0, "NR; Radio Resource Control (RRC); Protocol specifications"

NPL 11: 3GPP TS 38.323 v16.1.0, "NR; Packet Data Convergence Protocol (PDCP) specification"

NPL 12: 3GPP TS 38.322 v16.1.0, "NR; Radio Link Control (RLC) protocol specification"

NPL 13: 3GPP TS 38.321 v16.1.0, "NR; Medium Access Control (MAC) protocol specification"

NPL 14: 3GPP TS 23.401 v16.7.0, "General Packet Radio Service (GPRS) enhancements for Evolved Universal Terrestrial Radio Access Network (E-UTRAN) access"

NPL 15: 3GPP TS 26.346 v16.5.0, "Multimedia Broadcast/Multicast Service (MBMS); Protocols and codecs"

NPL 16: 3GPP TS 37.324 v16.1.0, "NR; Service Data Adaptation Protocol (SDAP) specification"

SUMMARY OF INVENTION

Technical Problem

As one aspect of the study of the enhanced technology of E-UTRA, in order to provide multicast/broadcast services, Multimedia Broadcast Multicast Service (MBMS) transmission technology has been standardized. For the MBMS transmission, transmission using a Multicast Broadcast Single Frequency Network (MBSFN) or a Single Cell Point-To-Multipoint (SC-PTM) is used.

In the transmission using the MBSFN, transmission of multicast/broadcast data is performed using a Physical Multicast Channel (PMCH) for each Multicast-Broadcast Single-Frequency Network (MBSFN) area including multiple cells. In contrast, in the transmission using the SC-PTM, transmission of multicast data is performed using a Physical Downlink Shared Channel (PDSCH) for each cell.

At the same time, multicast/broadcast services (Multicast Broadcast Services (MBS)) have been under study as the enhanced technology of NR. (NPL 1). In a case that the MBS is performed via NR, technology specific to NR which is different from that of E-UTRA, a core network standardized for 5G, and the like need to be taken into consideration. However, studies have not yet been carried out on detailed operations for efficiently receiving the MBS by using NR.

An aspect of the present invention is made in view of the circumstances described above, and has an object to provide a terminal apparatus, a base station apparatus, a method, and an integrated circuit that enable efficient reception of MBS by using NR.

Solution to Problem

In order to accomplish the object described above, an aspect of the present invention is contrived to provide the following means. Specifically, an aspect of the present invention is a terminal apparatus for communicating with a base station apparatus, the terminal apparatus being configured to release, based on receiving, via a DCCH from the base station apparatus, an RRC message including a part of session information of an MBS session, an MBS radio bearer used to receive the MBS session.

An aspect of the present invention is a terminal apparatus for communicating with a base station apparatus, the terminal apparatus being configured to release, based on receiving an MBS session on a point-to-point basis, an MBS radio bearer used to receive the MBS session.

An aspect of an embodiment of the present invention is a base station apparatus for communicating with a terminal apparatus, the base station apparatus being configured to cause the terminal apparatus to release, based on transmitting, via a DCCH to the terminal apparatus, an RRC message including a part of session information of an MBS session, an MBS radio bearer used to receive the MBS session.

An aspect of an embodiment of the present invention is a method for a terminal apparatus for communicating with a base station apparatus, the method including releasing, based on receiving, via a DCCH from the base station apparatus, an RRC message including a part of session information of an MBS session, an MBS radio bearer used to receive the MBS session.

An aspect of an embodiment of the present invention is a method for a terminal apparatus for communicating with a base station apparatus, the method including releasing, based on receiving an MBS session on a point-to-point basis, an MBS radio bearer used to receive the MBS session.

An aspect of an embodiment of the present invention is a method for a base station apparatus for communicating with a terminal apparatus, the method including causing the terminal apparatus to release, based on transmitting, via a DCCH to the terminal apparatus, an RRC message including a part of session information of an MBS session, an MBS radio bearer used to receive the MBS session.

Note that these comprehensive or specific aspects may be implemented in a system, an apparatus, a method, an integrated circuit, a computer program, or a recording medium, or may be implemented in any combination of systems, apparatuses, methods, integrated circuits, computer programs, and recording media.

Advantageous Effects of Invention

According to an aspect of the present invention, the terminal apparatus can efficiently receive the MBS by using NR.

BRIEF DESCRIPTION OF DRAWINGS

FIG. 7 is an example of an ASN.1 notation included in a message related to reconfiguration of RRC connection in NR according to an embodiment of the present invention.

FIG. 8 is an example of an ASN.1 notation included in a message related to reconfiguration of RRC connection in E-UTRA according to an embodiment of the present invention.

FIG. 10 is a diagram illustrating an example of ASN.1 notation representing fields and/or information elements included in System Information Block Type 20 (SIB20).

FIG. 11 is a diagram illustrating an example of ASN.1 notation representing fields and/or information elements included in an SC-PTM configuration message (SCPTMConfiguration).

FIG. 12 is a diagram illustrating an example illustrating a configuration of an SDAP sublayer according to an embodiment of the present invention.

DESCRIPTION OF EMBODIMENTS

Hereinafter, an embodiment of the present invention will be described in detail with reference to the drawings.

LTE (and LTE-A, LTE-A Pro) and NR may be defined as different Radio Access Technologies (RATs). The NR may be defined as a technology included in the LTE. The LTE may be defined as a technology included in the NR. The LTE connectable to the NR by using Multi Radio Dual connectivity may be distinguished from the existing LTE. The LTE in which a 5GC is used as a core network may be distinguished from a conventional LTE, where an EPC is used as a core network. The present embodiment may be applied to the NR, the LTE and other RATs. Terms associated with the LTE and the NR are used in the following description. However, the present embodiment may be applied to other technologies using other terms. In the present embodiment, the term "E-UTRA" may be replaced with "LTE," and the term "LTE" may be replaced with "E-UTRA."

Figure 1:
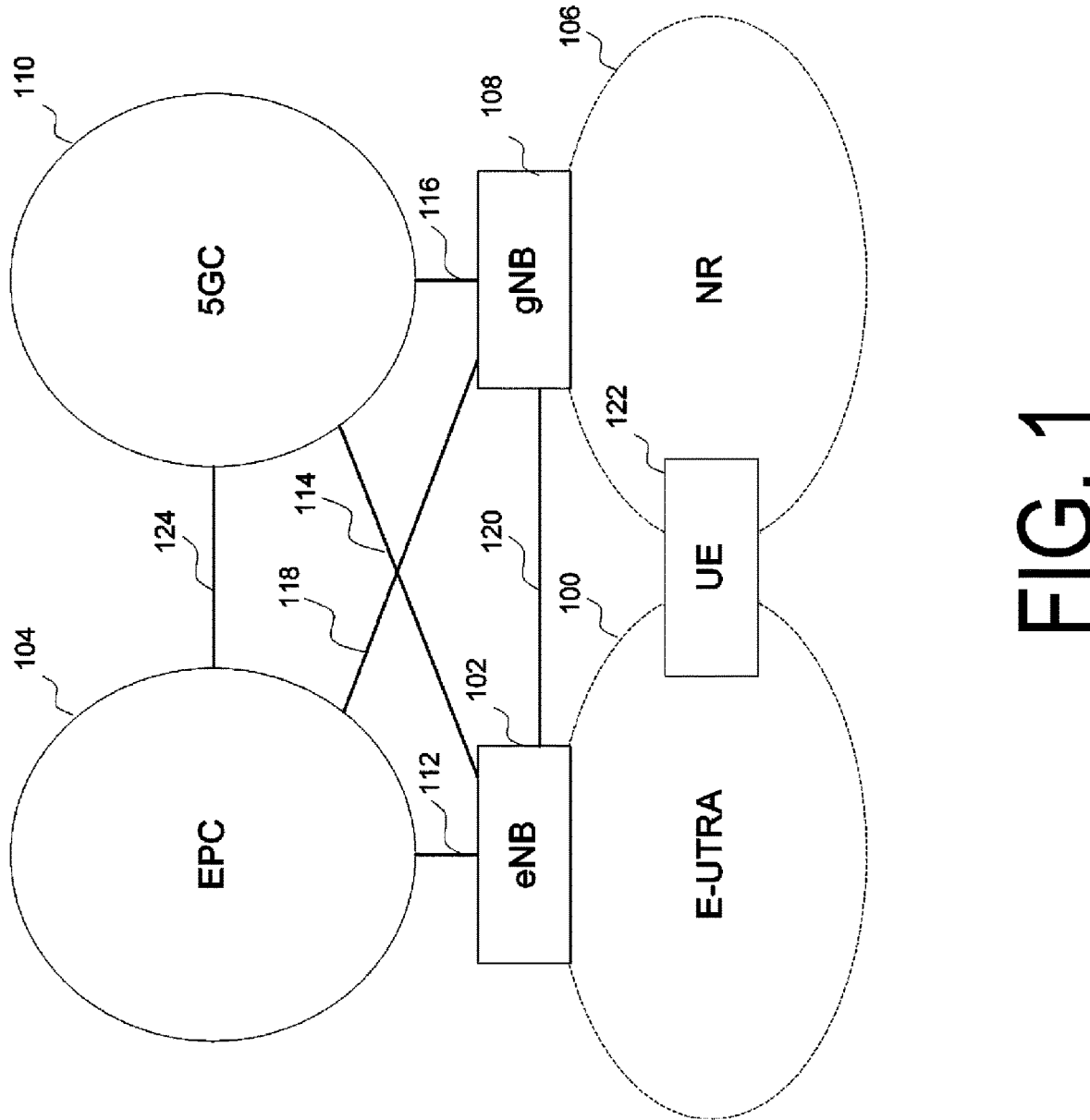
FIG. 1 is a schematic diagram of a communication system according to each embodiment of the present invention.

FIG. 1 is a schematic diagram of a communication system according to each embodiment of the present invention.

An E-UTRA 100 is a radio access technology described in NPL 3 or the like, and includes a cell group (CG) including one or multiple frequency bands. An E-UTRAN Node B (eNB) 102 is a base station apparatus of the E-UTRA 100. An Evolved Packet Core (EPC) 104 is a core network described in NPL 14 and the like and is designed as a core network for the E-UTRA 100. An interface 112 is an interface between the eNB 102 and the EPC 104, where there is a control plane (CP) through which control signals are transferred and a user plane (UP) through which user data is transferred.

An NR 106 is a radio access technology described in NPL 9 and the like, and includes a cell group (CG) including one or multiple frequency bands. A gNodeB (gNB) 108 is a base station apparatus in the NR 106. A 5GC 110 is a core network described in NPL 2 and the like, and is designed as a core network for the NR 106, but may also be used as a core network for the E-UTRA 100 and including a function to connect to the 5GC 110. Hereinafter, the E-UTRA 100 may include the E-UTRA 100 including a function to connect to the 5GC 110.

An interface 114 is an interface between the eNB 102 and the 5GC 110, an interface 116 is an interface between the gNB 108 and the 5GC 110, an interface 118 is an interface between the gNB 108 and the EPC 104, an interface 120 is an interface between the eNB 102 and the gNB 108, and an interface 124 is an interface between the EPC 104 and 5GC 110. The interface 114, the interface 116, the interface 118, the interface 120, the interface 124, and the like may be interfaces that allow a CP only, an UP only, or both the CP and UP to pass through. The interface 114, the interface 116, the interface 118, the interface 120, the interface 124, and the like may be absent depending on a communication system provided by a network operator.

A UE 122 is a terminal apparatus supporting one or all of the E-UTRA 100 and the NR 106. As described in one or all of NPL 3 and NPL 9, in a case that the UE 122 connects to a core network via one or all of the E-UTRA 100 and the NR 106, a logical path called a radio bearer (RB) is established between the UE 122 and one or all of the E-UTRA 100 and the NR 106. The radio bearer used for the CP is referred to as a Signaling Radio Bearer (Signaling Radio Bearer (SRB)), and the radio bearer used for the UP is referred to as a Data Radio Bearer (DRB). Each RB is assigned an RB identity (or an RB ID) and uniquely identified. The RB identity for the SRB is referred to as an SRB identity (or an SRB ID), and the RB identity for the DRB is referred to as a DRB identity (or a DRB ID).

As described in NPL 3, in a case that a connection destination core network for the UE 122 is an EPC 104, each DRB established between the UE 122 and any or all of the E-UTRA 100 and the NR 106 is uniquely linked to each Evolved Packet System (EPS) bearer passing through the EPC 104. Each EPS bearer is assigned an EPS bearer identity (or ID), and uniquely identified. Identical QoS is ensured for data passing through an identical EPS bearer.

As described in NPL 9, in a case that a connection destination core network of the UE 122 is the 5GC 110, one or multiple DRBs established between the UE 122 and one or all of the E-UTRA 100 and the NR 106 are further linked to one of the Packet Data Unit (PDU) sessions established in the 5GC 110. One or multiple QoS flows are present in each PDU session. Each DRB may be mapped to one or multiple QoS flows present in the linked PDU session or to none of the QoS flows. Each PDU session is identified by a PDU session identity (or ID). Each QoS flow is identified by a QoS flow identity. Identical QoS is ensured for data passing through an identical QoS flow.

In the EPC 104, either of the PDU sessions or the QoS flows is absent or none of the PDU sessions and the QoS flows are present. No EPS bearers are present in the 5GC 110. In a case that the UE 122 is connected to the EPC 104, the UE 122 has information of the EPS bearers, but does not have any or all of the PDU sessions and the QoS flows. In a case that the UE 122 is connected to the 5GC 110, the UE 122 has information of any or all of the PDU sessions and the QoS flows, but does not have information of the EPS bearers.

Note that, in the following description, the eNB 102 and/or the gNB 108 is simply referred to as a base station apparatus, and the UE 122 is also simply referred to as a terminal apparatus.

Figure 2:
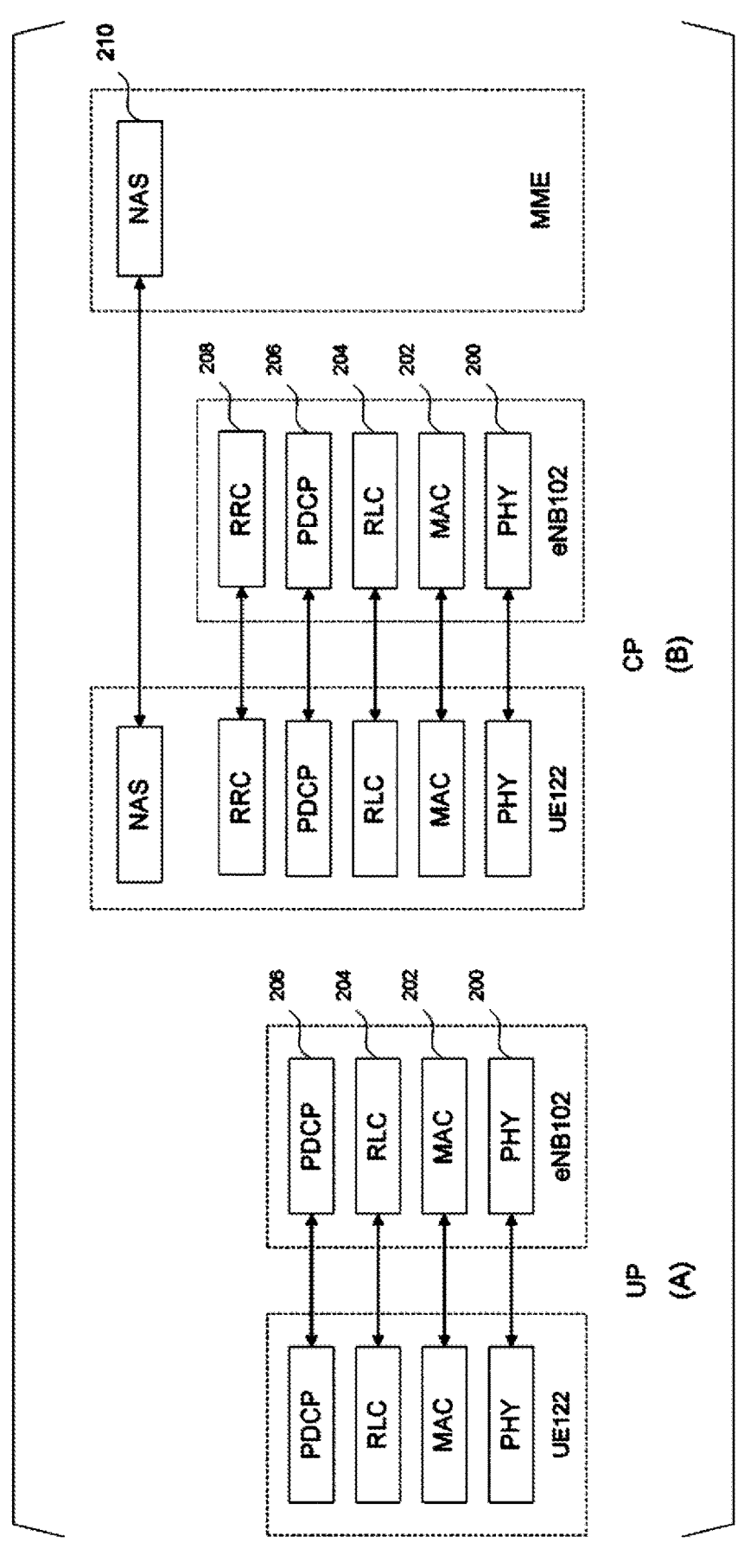
FIG. 2 is a diagram of protocol stacks of a UP and a CP of a terminal apparatus and a base station apparatus in E-UTRA according to each embodiment of the present invention.

FIG. 2 is a diagram of protocol stacks of UP and CP of a terminal apparatus and a base station apparatus in an E-UTRA radio access layer according to each embodiment of the present invention.

FIG. 2(A) is a diagram of a protocol stack of the UP used in a case that the UE 122 communicates with the eNB 102 in the E-UTRA 100.

A Physical layer (PHY) 200 is a radio physical layer and provides a transmission service to a higher layer by using a physical channel. The PHY 200 is connected with a Medium Access Control layer (MAC) 202 of a higher layer to be described below via transport channels. Data is exchanged between the MAC 202 and the PHY 200 via the transport channels. The data is transmitted and/or received via radio physical channels between the PHYs of the UE 122 and the eNB 102. In the PHY 200, in order to identify various pieces of control information, a Radio Network Temporary Identifire (RNTI) is used.

The MAC 202 is a medium access control layer that maps various logical channels to various transport channels. The MAC 202 is connected with a radio link control layer (RLC) 204 of a higher layer to be described below via logical channels. The major classifications of the logical channel depend on the type of information to be transmitted, specifically, the logical channels are classified into control channels for transmitting control information and traffic channels for transmitting user information. The MAC 202 has a function of controlling the PHY 200 in order to perform discontinuous reception (DRX) and/or discontinuous transmission (DTX), a function of performing a random access procedure, a function of notifying transmit power information, a function of performing HARQ control, and the like (NPL 7).

Uplink (UL) and/or downlink (DL) logical channels used in E-UTRA will be described.

A Broadcast Control Channel (BCCH) may be a downlink logical channel for broadcasting control information, such as system information (SI).

A Paging Control Channel (PCCH) may be a downlink logical channel for carrying a paging message. The PCCH may be used for notifying change of the system information.

A Common Control Channel (CCCH) may be a logical channel for transmitting control information between the UE 122 and the eNB 102. The CCCH may be used in a case that the UE 122 does not have Radio Resource Control (RRC) connection to be described later. The CCCH may be used between the base station apparatus and multiple terminal apparatuses.

A Dedicated Control Channel (DCCH) may be a logical channel for transmitting dedicated control information in a point-to-point bi-directional manner between the UE 122 and the eNB 102. The dedicated control information may be control information dedicated to each terminal apparatus. The DCCH may be used in a case that the UE 122 and the eNB 102 have Radio Resource Control (RRC) connection to be described later therebetween.

A Dedicated Traffic Channel (DTCH) may be a logical channel for transmitting user data in a point-to-point manner between the UE 122 and the eNB 102. The DTCH may be a logical channel for transmitting dedicated user data. The dedicated user data may be user data dedicated to each terminal apparatus. The DTCH may be present in both the uplink and the downlink.

A Multicast Traffic Channel (MTCH) may be a point-to-multipoint downlink channel for transmitting data from the eNB 102 to the UE 122. The MTCH may be a multicast logical value channel. The MTCH may be used by the UE 122 only in a case that the UE 122 receives MBMS.

A Multicast Control Channel (MCCH) may be a point-to-multipoint downlink channel for transmitting MBMS control information for one or multiple MTCHs from the eNB 102 to the UE 122. The MCCH may be a multicast logical value channel. The MCCH may be used by the UE 122 only in a case that the UE 122 receives MBMS, or in a case that the UE 122 is interested in receiving MBMS.

A Single Cell Multicast Traffic Channel (SC-MTCH) may be a point-to-multipoint downlink channel for transmitting data from the eNB 102 to the UE 122 by using the SC-PTM. The SC-MTCH may be a multicast logical channel. The SC-MTCH may be used by the UE 122 only in a case that the UE 122 receives MBMS by using the Single Cell Point-To-Multipoint (SC-PTM).

A Single Cell Multicast Control Channel (SC-MCCH) may be a point-to-multipoint downlink channel for transmitting MBMS control information for one or multiple SC-MTCHs from the eNB 102 to the UE 122. The SC-MCCH may be a multicast logical channel. The SC-MCCH may be used by the UE 122 only in a case that the UE 122 receives MBMS by using the SC-PTM or a case that the UE 122 is interested in receiving MBMS by using the SC-PTM.

Mapping between the uplink logical channels and the transport channels in E-UTRA will be described.

The CCCH may be mapped to an Uplink Shared Channel (UL-SCH) being an uplink transport channel.

The DCCH may be mapped to an Uplink Shared Channel (UL-SCH) being an uplink transport channel.

The DTCH may be mapped to an Uplink Shared Channel (UL-SCH) being an uplink transport channel.

Mapping between the downlink logical channels and the transport channels in E-UTRA will be described.

The BCCH may be mapped to a Broadcast Channel (BCH) and/or a Downlink Shared Channel (DL-SCH) being a downlink transport channel.

The PCCH may be mapped to a Paging Channel (PCH) being a downlink transport channel.

The CCCH may be mapped to a Downlink Shared Channel (DL-SCH) being a downlink transport channel.

The DCCH may be mapped to a Downlink Shared Channel (DL-SCH) being a downlink transport channel.

The DTCH may be mapped to a Downlink Shared Channel (DL-SCH) being a downlink transport channel.

The MTCH may be mapped to a Multicast Channel (MCH) being a downlink transport channel.

The MCCH may be mapped to a Multicast Channel (MCH) being a downlink transport channel.

The SC-MTCH may be mapped to a Downlink Shared Channel (DL-SCH) being a downlink transport channel The SC-MTCH may be mapped to a Downlink Shared Channel (DL-SCH) being a downlink transport channel.

The RLC 204 is a radio link control layer that performs segmentation of data received from a Packet Data Convergence Protocol Layer (PDCP) 206 of a higher layer to be described below, and adjusts the data size such that a lower layer can properly transmit the data. The RLC 204 has three modes, namely a Transparent Mode (TM), an Unacknowledged Mode (UM), and an Acknowledged Mode (AM). In the TM, segmentation of data received from a higher layer is not performed, and addition of an RLC header is not performed. In the UM, segmentation of data received from a higher layer, addition of an RLC header, and the like are performed, but retransmission control of data is not performed. In the AM, segmentation of data received from a higher layer, addition of an RLC header, retransmission control of data, and the like are performed. A retransmission control function may be a function for ensuring Quality of Service (QoS) required by each piece of data. In a case that retransmission control of data is performed, information of undelivered data transmitted from a reception side to a transmission side of the RLC is referred to as a status report. An indication to prompt the status report transmitted from the transmission side to the reception side of the RLC is referred to as a poll. Note that data transmitted to a lower layer in the TM may be referred to as a TMD PDU, data transmitted to a lower layer in the UM may be referred to as a UMD PDU, and data transmitted to a lower layer in the AM may be referred to as an AMD PDU. (NPL 6).

The PDCP 206 is a packet data convergence protocol layer for efficiently transmitting user data such as an IP packet in radio sections. The PDCP 206 may have a header compression or decompression function. The PDCP 206 may have a data ciphering or deciphering function. The PDCP 206 may have a data integrity protection or integrity validation function. The PDCP 206 may have a re-ordering function (NPL 5).

Note that data processed in the MAC 202, the RLC 204, and the PDCP 206 are referred to as a MAC Protocol Data Unit (PDU), an RLC PDU, and a PDCP PDU, respectively. Data delivered from or to a higher layer to or from the MAC 202, the RLC 204, and the PDCP 206 is referred to as a MAC Service Data Unit (SDU), an RLC SDU, and a PDCP SDU, respectively. A segmented RLC SDU is referred to as an RLC SDU segment.

In order to make a distinction between data use and control use, the PDCP PDU may be referred to as a PDCP DATA PDU (PDCP Data PDU, PDCP data PDU) and a PDCP CONTROL PDU (PDCP Control PDU, PDCP control PDU). In order to make a distinction between data use and control use, the RLC PDU may be referred to as an RLC DATA PDU (RLC Data PDU, RLC data PDU) and an RLC CONTROL PDU (RLC Control PDU, RLC control PDU, RLC control ODU).

FIG. 2(B) is a protocol stack diagram of the CP used by the UE 122 in communicating with the eNB 102 and a Mobility Management Entity (MME) used as a logical node providing functions such as authentication and mobility management in the E-UTRA 100.

In the protocol stack of the CP, a Radio Resource Control layer (RRC) 208 and a non Access Strarum (NAS) 210 are present in addition to the PHY 200, the MAC 202, the RLC 204, and the PDCP 206. The RRC 208 is a radio link control layer that performs processing such as establishment, re-establishment, suspension, resumption, and the like of an RRC connection, reconfiguration of the RRC connection, for example, configuration of the radio bearer (RB) and the cell group such as establishment, change, or release, control of logical channels, transport channels, and physical channels, and the like, and further performs configuration of handover and measurement, and the like. The RBs may be classified into a Signaling Radio Bearer (Signaling Radio Bearer (SRB)) and a Data Radio Bearer (DRB), and the SRB may be used as a path for transmitting an RRC message which is control information. The DRB may be used as a path for transmitting the user data. Each RB may be configured between the RRCs 208 of the eNB 102 and the UE 122. A portion of the RB including the RLC 204 and the logical channel may be referred to as an RLC bearer (NPL 4). In contrast to a NAS layer for carrying signals between the MME and the UE 122, a part of layers or all of layers of the PHY 200, the MAC 202, the RLC 204, the PDCP 206, and the RRC 208 for carrying signals and data between the UE 122 and the eNB 102 may be referred to as an Access Strarum (AS) layer.

For the SRB, the following SRB0 to SRB2 may be defined, or other SRBs may be defined. SRB0 may be an SRB used for an RRC message and using a Common Control CHannel (CCCH) corresponding to a logical channel. SRB1 may be an SRB for the RRC message (which may include a piggybacked NAS message) and for the NAS message prior to the establishment of SRB2, and the Dedicated Control CHannel (DCCH) corresponding to a logical channel may be used for all cases. SRB2 may be an SRB for the NAS message, and the DCCH corresponding to a logical channel may be used for all cases. SRB2 may have a lower priority than SRB1.

The RRC message may be transmitted using the BCCH of the logical channel, may be transmitted using the PCCH of the logical channel, may be transmitted using the MCCH of the logical channel, may be transmitted using the CCCH of the logical channel, or may be transmitted using the DCCH of the logical channel.

For example, the RRC message transmitted using the BCCH may include a Master Information Block described in NPL 4, may include a System Information Block of each type, or may include another RRC message.

For example, the RRC message transmitted using the PCCH may include a paging message described in NPL 4, or may include another RRC message.

For example, the RRC message transmitted using the MCCH may include a Multicast Broadcast Single Frequency Network (MBSFN) area configuration (MBSFNAreaConfiguration) described in NPL 4, may include an MBMS continuing request (MBMSContinuingRequest), or may include another RRC message.

For example, the RRC message transmitted in an uplink (UL) direction using the CCCH may include an RRC connection request message (RRC Connection Request), an RRC connection resume request message (RRC Connection Resume Request), an RRC connection reestablishment request message (RRC Connection Reestablishment Request), or the like described in NPL 4, or may include another RRC message. For example, the RRC message transmitted in a downlink (DL) direction using the CCCH may include an RRC connection reject message (RRC Connection Reject), an RRC connection setup message (RRC Connection Setup), an RRC connection reestablishment message (RRC Connection Reestablishment), an RRC connection reestablishment reject message (RRC Connection Reestablishment Reject), or the like described in NPL 4, or may include another RRC message.

For example, the RRC message transmitted in the uplink (UL) direction using the DCCH may include a measurement report message (Measurement Report), an RRC connection reconfiguration complete message (RRC Connection Reconfiguration Complete), an RRC connection setup complete message (RRC Connection Setup Complete), an RRC connection reestablishment complete message (RRC Connection Reestablishment Complete), or the like described in NPL 4, or may include another RRC message. For example, the RRC message transmitted in the downlink (DL) direction using the CCCH may include an RRC connection reconfiguration message (RRC Connection Reconfiguration), an RRC connection release message (RRC Connection Release), or the like described in NPL 4, or may include another RRC message.

The functional classification of the MAC 202, the RLC 204, the PDCP 206, and the RRC 208 described above is an example, and some or all of the respective functions may not be implemented. Some or all of the functions of each layer may be included in another layer.

Note that an IP layer and a Transmission Control Protocol (TCP) layer, a User Datagram Protocol (UDP) layer, an application layer, and the like, which are higher layers than the IP layer, are higher layers than a PDCP layer (not illustrated). An RRC layer and a non Access Strarum (NAS) layer are also higher layers than the PDCP layer (not illustrated). In other words, the PDCP layer is a lower layer than the RRC layer, the NAS layer, the IP layer, and the Transmission Control Protocol (TCP) layer, the User Datagram Protocol (UDP) layer, and the application layer, which are higher layers than the IP layer.

Figure 3:
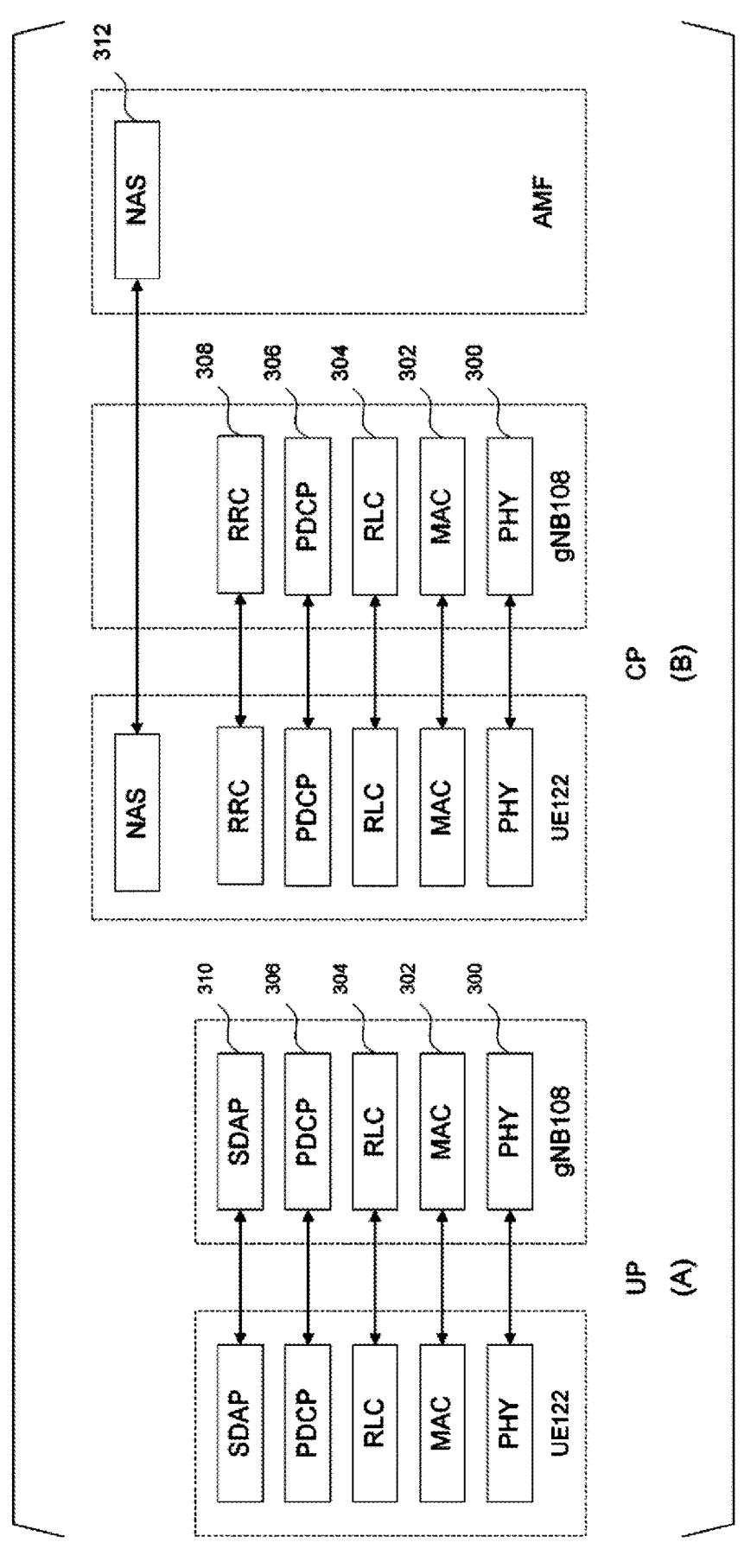
FIG. 3 is a diagram of protocol stacks of the UP and the CP of the terminal apparatus and the base station apparatus in NR according to each embodiment of the present invention.

FIG. 3 is a diagram of protocol stacks of UP and CP of a terminal apparatus and a base station apparatus in an NR radio access layer according to each embodiment of the present invention.

FIG. 3(A) is a diagram of the protocol stack of the UP used by the UE 122 in communicating with the gNB 108 in the NR 106.

A physical layer (PHY) 300 is a radio physical layer of the NR and may provide a transmission service to a higher layer by using a physical channel. The PHY 300 may be connected with the Medium Access Control layer (MAC) 302 of a higher layer to be described below via the transport channels. Data may be exchanged between the MAC 302 and the PHY 300 via the transport channels. The data may be transmitted and/or received between the PHYs of the UE 122 and the gNB 108 via the radio physical channel. In the PHY 200, in order to identify various pieces of control information, a Radio Network Temporary Identifire (RNTI) may be used.

Now, the physical channels will be described.

The following physical channels may be used for the radio communication between the terminal apparatus and the base station apparatus.

Physical Broadcast CHannel (PBCH)

Physical Downlink Control CHannel (PDCCH)

Physical Downlink Shared CHannel (PDSCH)

Physical Uplink Control CHannel (PUCCH)

Physical Uplink Shared CHannel (PUSCH)

Physical Random Access CHannel (PRACH)

The PBCH is used to broadcast system information required by the terminal apparatuses.

The PBCH may be used to broadcast time indexes (SSB-Indexes) within the periodicity of synchronization signal blocks (also referred to as SS/PBCH blocks) in NR.

The PDCCH is used to transmit (or carry) downlink control information (DCI) in a case of downlink radio communication (radio communication from the base station apparatus 3 to the terminal apparatus). Here, one or multiple pieces of DCI (which may also be referred to as DCI formats) are defined for transmission of the downlink control information. In other words, a field for the downlink control information is defined as DCI and is mapped to information bits. The PDCCH is transmitted in a PDCCH candidate. The terminal apparatus monitors a set of PDCCH candidates in the serving cell. The monitoring means an attempt to decode the PDCCH in accordance with a certain DCI format. The certain DCI format may be used for scheduling of the PUSCH in the serving cell. The PUSCH may be used for transmission of user data, transmission of RRC messages, and the like.

The PUCCH is used to transmit Uplink Control Information (UCI) in a case of uplink radio communication (radio communication from the terminal apparatus to the base station apparatus). Here, the uplink control information may include Channel State Information (CSI) used to indicate a downlink channel state. The uplink control information may include Scheduling Request (SR) used to request an UL-SCH resource. The uplink control information may include a Hybrid Automatic Repeat request ACKnowledgement (HARQ-ACK).

The PDSCH may be used to transmit downlink data (Downlink Shared CHannel (DL-SCH)) from the MAC layer. In a case of the downlink, the PDSCH is also used to transmit System Information (SI), a Random Access Response (RAR), and the like.

The PUSCH may be used to transmit uplink data (Uplink-Shared CHannel (UL-SCH)) from the MAC layer or to transmit the HARQ-ACK and/or CSI along with the uplink data. The PUSCH may be used to transmit CSI only or a HARQ-ACK and CSI only. In other words, the PUSCH may be used to transmit the UCI only. The PDSCH or the PUSCH may be used to transmit RRC signalling (also referred to as RRC messages) and MAC control elements. In this regard, in the PDSCH, the RRC signalling transmitted from the base station apparatus may be signalling common to multiple terminal apparatuses in a cell. The RRC signalling transmitted from the base station apparatus may be dedicated signalling for a certain terminal apparatus (also referred to as dedicated signalling). In other words, terminal apparatus-specific (UE-specific) information may be transmitted through dedicated signalling to the certain terminal apparatus. The PUSCH may be used to transmit UE capabilities in the uplink.

The PRACH may be used for transmitting a random access preamble. The PRACH may be used for indicating the initial connection establishment procedure, the handover procedure, the connection re-establishment procedure, synchronization (timing adjustment) for uplink transmission, and a request for a PUSCH (UL-SCH) resource.

The MAC 302 is a medium access control layer that maps various logical channels to various transport channels. The MAC 302 may be connected with the Radio Link Control layer (RLC) 304 of a higher layer to be described below via the logical channels. The classification of the logical channel depends on the type of information to be transmitted, and the logical channels may be classified into the control channels for transmitting the control information and the traffic channels for transmitting the user information. The MAC 302 may have a function of controlling the PHY 300 in order to perform the Discontinuous Reception and Transmission (DRX and DTX), a function of performing the random access procedure, a function of notifying the transmit power information, a function of performing the HARQ control, and the like (NPL 13)

Uplink (UL) and/or downlink (DL) logical channels used in NR will be described.

A Broadcast Control Channel (BCCH) may be a downlink logical channel for broadcasting control information, such as system information (SI).

A Paging Control Channel (PCCH) may be a downlink logical channel for carrying a paging message.

A Common Control Channel (CCCH) may be a logical channel for transmitting control information between the UE 122 and the gNB 108. The CCCH may be used in a case that the UE 122 does not have RRC connection. The CCCH may be used between the base station apparatus and multiple terminal apparatuses.

A Dedicated Control Channel (DCCH) may be a logical channel for transmitting dedicated control information in a point-to-point bi-directional manner between the UE 122 and the gNB 108. The dedicated control information may be control information dedicated to each terminal apparatus. The DCCH may be used in a case that the UE 122 has RRC connection.

A Dedicated Traffic Channel (DTCH) may be a logical channel for transmitting user data in a point-to-point manner between the UE 122 and the gNB 108. The DTCH may be a logical channel for transmitting dedicated user data. The dedicated user data may be user data dedicated to each terminal apparatus. The DTCH may be present in both the uplink and the downlink.

Mapping between the uplink logical channels and the transport channels in NR will be described.

The CCCH may be mapped to an Uplink Shared Channel (UL-SCH) being an uplink transport channel.

The DCCH may be mapped to an Uplink Shared Channel (UL-SCH) being an uplink transport channel.

The DTCH may be mapped to an Uplink Shared Channel (UL-SCH) being an uplink transport channel.

Mapping between the downlink logical channels and the transport channels in NR will be described.

The BCCH may be mapped to a Broadcast Channel (BCH) and/or a Downlink Shared Channel (DL-SCH) being a downlink transport channel.

The PCCH may be mapped to a Paging Channel (PCH) being a downlink transport channel.

The CCCH may be mapped to a Downlink Shared Channel (DL-SCH) being a downlink transport channel.

The DCCH may be mapped to a Downlink Shared Channel (DL-SCH) being a downlink transport channel.

The DTCH may be mapped to a Downlink Shared Channel (DL-SCH) being a downlink transport channel.

The RLC 304 is a radio link control layer that performs segmentation of data received from a Packet Data Convergence Protocol Layer (PDCP) 306 of a higher layer to be described below, and adjusts the data size such that a lower layer can properly transmit the data. The RLC 304 has three modes, namely a Transparent Mode (TM), an Unacknowledged Mode (UM), and an Acknowledged Mode (AM). In the TM, segmentation of data received from a higher layer is not performed, and addition of an RLC header is not performed. In the UM, segmentation of data received from a higher layer, addition of an RLC header, and the like are performed, but retransmission control of data is not performed. In the AM, segmentation of data received from a higher layer, addition of an RLC header, retransmission control of data, and the like are performed. A retransmission control function may be a function for ensuring Quality of Service (QoS) required by each piece of data. In a case that retransmission control of data is performed, information of undelivered data transmitted from a reception side to a transmission side of the RLC is referred to as a status report. An indication to prompt the status report transmitted from the transmission side to the reception side of the RLC is referred to as a poll. Note that data transmitted to a lower layer in the TM may be referred to as a TMD PDU, data transmitted to a lower layer in the UM may be referred to as a UMD PDU, and data transmitted to a lower layer in the AM may be referred to as an AMD PDU. (NPL 12).

The PDCP 306 is a packet data convergence protocol layer for efficiently transmitting user data such as an IP packets in radio sections. The PDCP 306 may have a header compression or decompression function. The PDCP 306 may have a data ciphering or deciphering function, and a data integrity protection or integrity validation function. The PDCP 306 may include a re-ordering function (NPL 11).

A Service Data Adaptation Protocol (SDAP) 310 is a service data adaptation protocol layer that has functions to map the DRB to a downlink QoS flow transmitted from the 5GC 110 to the terminal apparatus via the base station apparatus, to map the DRB to an uplink QoS flow transmitted from the terminal apparatus to the 5GC 110 via the base station apparatus, and to store mapping rule information (NPL 16).

Note that the data processed in the MAC 302, the RLC 304, the PDCP 306, and the SDAP 310 are referred to as a MAC Protocol Data Unit (PDU), an RLC PDU, a PDCP PDU, and an SDAP PDU, respectively. Data delivered from or to a higher layer to or from the MAC 302, the RLC 304, the PDCP 306, and the SDAP 310 is referred to as a MAC Service Data Unit (SDU), an RLC SDU, a PDCP SDU, and an SDAP SDU, respectively. A segmented RLC SDU is referred to as an RLC SDU segment.

In order to make a distinction between data use and control use, the SDAP PDU may be referred to as an SDAP DATA PDU (SDAP Data PDU, SDAP data PDU) and an SDAP CONTROL PDU (SDAP Control PDU, SDAP control PDU), respectively. In order to make a distinction between data use and control use, the PDCP PDU may be referred to as a PDCP DATA PDU (PDCP Data PDU, PDCP data PDU) and a PDCP CONTROL PDU (PDCP Control PDU, PDCP control PDU). In order to make a distinction between data use and control use, the RLC PDU may be referred to as an RLC DATA PDU (RLC Data PDU, RLC data PDU) and an RLC CONTROL PDU (RLC Control PDU, RLC control) PDU), respectively.

FIG. 3(B) is a protocol stack diagram of the CP used by the UE 122 in communicating with the gNB 108 and an Access and Mobility Management function (AMF) used as a logical node providing functions such as authentication and mobility management in the NR 106.

In the protocol stack of the CP, a Radio Resource Control layer (RRC) 308 and a non Access Strarum (NAS) 312 are present in addition to the PHY 300, the MAC 302, the RLC 304, and the PDCP 306. The RRC 308 is a radio link control layer that performs processing such as establishment, re-establishment, suspension, resumption, and the like of an RRC connection, reconfiguration of the RRC connection, for example, configuration of the radio bearer (RB) and the cell group such as establishment, change, or release, control of logical channels, transport channels, and physical channels, and the like, and further performs configuration of handover and measurement, and the like. The RBs may be classified into a Signaling Radio Bearer (Signaling Radio Bearer (SRB)) and a Data Radio Bearer (DRB), and the SRB may be used as a path for transmitting an RRC message which is control information. The DRB may be used as a path for transmitting the user data. Each RB may be configured between RRCs 308 of the gNB 108 and the UE 122. A portion of the RB including the RLC 304 and the logical channel may be referred to as an RLC bearer (NPL 10). In contrast to the NAS layer carrying signals between the AMF and the UE 122, some or all of the layers of the PHY 300, the MAC 302, the RLC 304, the PDCP 306, the RRC 308, and the SDAP 310 carrying signals and data between the UE 122 and the gNB 108 may be referred to as Access Strarum (AS) layers.

For the SRB, the following SRB0 to SRB3 may be defined, or other SRBs may be defined. SRB0 may be an SRB used for an RRC message and using a Common Control CHannel (CCCH) corresponding to a logical channel. SRB1 may be an SRB for the RRC message (which may include a piggybacked NAS message) and for the NAS message prior to the establishment of SRB2, and the Dedicated Control CHannel (DCCH) corresponding to a logical channel may be used for all cases. SRB2 may be an SRB for the NAS message, and the DCCH corresponding to a logical channel may be used for all cases. SRB2 may have a lower priority than SRB1. SRB3 may be an SRB for a particular RRC message in a case that the UE 122 is configured with EN-DC, NGEN-DC, or NR-DC to be described later or the like, and the DCCH corresponding to a logical channel may be used for all cases. Other SRBs may also be provided for other applications.

The RRC message may be transmitted using the BCCH of the logical channel, may be transmitted using the PCCH of the logical channel, may be transmitted using the CCCH of the logical channel, or may be transmitted using the DCCH of the logical channel.

For example, the RRC message transmitted using the BCCH may include a Master Information Block (MIB) described in NPL 10, may include a System Information Block (SIB) of each type, or may include another RRC message. For example, the RRC message transmitted using the PCCH may include a paging message described in NPL 10, or may include another RRC message.

For example, the RRC message transmitted in the uplink (UL) direction using the CCCH may include an RRC setup request message (RRC Setup Request), an RRC resume request message (RRC Resume Request), an RRC reestablishment request message (RRC Reestablishment Request), an RRC system information request message (RRC System Info Request), or the like described in NPL 10, or may include another RRC message. For example, the RRC message transmitted in the downlink (DL) direction using the CCCH may include an RRC connection reject message (RRC Reject), an RRC setup message (RRC Setup), or the like described in NPL 10, or may include another RRC message.

For example, the RRC message transmitted in the uplink (UL) direction using the DCCH may include a measurement report message (Measurement Report), an RRC reconfiguration complete message (RRC Reconfiguration Complete), an RRC setup complete message (RRC Setup Complete), an RRC reestablishment complete message (RRC Reestablishment Complete), tan RRC resume complete message (RRC Resume Complete), or the like described in NPL 10, or may include another RRC message. For example, the RRC message transmitted in the downlink (DL) direction using the CCCH may include an RRC reconfiguration message (RRC Reconfiguration), an RRC resume message (RRC Resume), an RRC release message (RRC Release), an RRC reestablishment message (RRC Reestablishment), or the like described in NPL 10, or may include another RRC message.

The functional classification of the MAC 302, the RLC 304, the PDCP 306, the SDAP 310, and the RRC 308 described above is an example, and some or all of the functions may not be implemented. Some or all of the functions of each layer may be included in another layer.

Note that a higher layer (not illustrated) than the AS layer may be referred to as a PDU layer, as described in NPL 2. The PDU layer may include any or all of an IP layer, a Transmission Control Protocol (TCP) layer and a User Datagram Protocol (UDP) layer that are higher layers than the IP layer, or other layers. The application layer may be a higher layer than the PDU layer or may be included in the PDU layer. Note that the PDU layer may be a higher layer with respect to the user plane of the AS layer. The RRC layer and the non Access Strarum (NAS) layer may also be a higher layer than one or all of the SDAP layer and the PDCP layer (this is not illustrated). In other words, one or all of the SDAP layer and the PDCP layer are lower layers than any or all of the RRC layer, the NAS layer, the IP layer, and the Transmission Control Protocol (TCP) layer, the User Datagram Protocol (UDP) layer, and the application layer that are higher layers than the IP layer.

Note that, in each embodiment of the present invention, any or all of the following may belong to the application layer: a Session Initiation Protocol (SIP), a Session Description Protocol (SDP), and the like used for an IP Multimedia Subsystem (IMS) being one service network standardized in 3GPP; a Real-time Transport Protocol (RTP), a Real-time Transport Control Protocol (RTCP), a HyperText Transfer Protocol (HTTP), and the like used for media communication or media communication control; and codecs of various media and the like.

Note that the RRC layer of the terminal apparatus may perform any or all of establishment, configuration, and control on the physical layer, the MAC layer, the RLC layer, the PDCP layer, and the SDAP layer of the terminal apparatus. The RRC layer of the terminal apparatus may establish and/or configure the physical layer, the MAC layer, the RLC layer, the PDCP layer, and the SDAP layer in accordance with the RRC message transmitted from the RRC layer of the base station apparatus. The MAC layer, the RLC layer, the PDCP layer, and the SDAP layer may respectively be referred to as a MAC sublayer, an RLC sublayer, a PDCP sublayer, and an SDAP sublayer.

Note that an entity may refer to each of the layers belonging to the AS layer configured for one or all of the terminal apparatus and the base station apparatus or the function of each layer. Specifically, the physical layer (PHY layer), the MAC layer, the RLC layer, the PDCP layer, the SDAP layer, and the RRC layer, on which any or all of establishment, configuration, and control is performed for one or all of the terminal apparatus and the base station apparatus, or the functions of the respective layers may be referred to as a physical entity (PHY entity), a MAC entity, an RLC entity, a PDCP entity, an SDAP entity, and an RRC entity, respectively. One or multiple entities may be included in each layer. Any or all of establishment, configuration, and control may be performed on the PDCP entity and the RLC entity for each radio bearer. Any or all of establishment, configuration, and control may be performed on the MAC entity for each cell group. Any or all of establishment, configuration, and control may be performed on the SDAP entity for each PDU session.

Note that a COUNT value may be used in a case that processing for ciphering or integrity protection is performed in the PDCP layer or the PDCP entity. The COUNT value may include a Hyper Frame Number (HFN) and a Sequence Number (SN) added to the header of the PDCP PDU. The sequence number may be incremented by one each time a PDCP DATA PDU is generated by the PDCP layer or PDCP entity on the transmission side. The HEN may be incremented by one each time the sequence number reaches the maximum value. In order to manage the COUNT value on the transmission side and the reception side, a part or all of the following state variables of (A) to (F) may be used:

(A) A state variable indicating the COUNT value of the PDCP SDU to be subsequently transmitted. The state variable may be a state variable referred to as TX NEXT described in NPL 11;

(B) A state variable indicating the sequence number of the PDCP SDU to be subsequently transmitted, in the present PDCP entity. The state variable may be a state variable referred to as Next_PDCP_TX_SN described in NPL 5;

(C) A state variable indicating the HEN value used for generating the COUNT value of the PDCP PDU in the present PDCP entity. The state variable may be a state variable referred to as TX_HFN described in NPL 5;

(D) A state variable indicating the COUNT value of the PDCP SDU expected to be subsequently received on the reception side of the PDCP entity. The state variable may be a state variable referred to as RX_NEXT described in NPL 11;

(E) A state variable indicating the sequence number of the PDCP SDU expected to be subsequently received on the reception side of the present PDCP entity. The state variable may be a state variable referred to as Next_PDCP_RX_SN described in NPL 5;

(F) A state variable indicating the HFN value used for generating the COUNT value for a received PDCP PDU in the present PDCP entity. The state variable may be a state variable referred to as RX_HFN described in NPL 5.

In the PDCP layer or the PDCP entity, re-ordering may be processing for storing the PDCP SDUs in a receive buffer and delivering the PDCP SDUs to a higher layer according to the order of the COUNT values obtained from header information of the PDCP DATA PDUs. Re-ordering may include processing for delivering, in a case that the COUNT value of the PDCP data PDU received is the COUNT value of a first PDCP SDU not delivered to the higher layer yet, the stored PDCP SDUs to the higher layer according to the order of COUNT values. In other words, in a case that the PDCP data PDUs having the COUNT values smaller than the COUNT values of the received PDCP data PDUs have not yet been successfully received (PDCP data PDUs are lost), re-ordering may be processing in which the received PDCP data PDUs are converted into the PDCP SDUs and the PDCP SDUs are stored in a re-ordering buffer, and after all of the lost PDCP data PDUs are received and then converted into the PDCP SDUs, the PDCP SDUs are delivered to the higher layer. In re-ordering, in order to detect loss of the PDCP data PDUs, a re-ordering timer (a timer referred to as t-Reordering described in NPL 11 or NPL 5) may be used. For re-ordering, a part or all of the following state variables of (A) to (F) may be used:

(A) A state variable indicating the COUNT value of the PDCP SDU expected to be subsequently received on the reception side of the PDCP entity. The state variable may be a state variable referred to as RX_NEXT described in NPL 11;

(B) A state variable indicating the sequence number of the PDCP SDU expected to be subsequently received on the reception side of the present PDCP entity. The state variable may be a state variable referred to as Next_PDCP_RX_SN described in NPL 5;

(C) A state variable indicating the HFN value used for generating the COUNT value for a received PDCP PDU in the present PDCP entity. The state variable may be a state variable referred to as RX_HFN described in NPL 5;

(D) A state variable indicating the COUNT value of a first PDCP PDU out of PDCP SDUs that are to be received and have not been delivered to a higher layer on the reception side of the PDCP entity. The state variable may be a state variable referred to as RX_DELIV described in NPL 11;

(E) A state variable indicating the sequence number of the PDCP PDU out of the PDCP SDUs that were last delivered to a higher layer on the reception side of the present PDCP entity. The state variable may be a state variable referred to as Last_Submitted_PDCP_RX_SN described in NPL 5;

(F) A state variable indicating a COUNT value next to the COUNT value of the PDCP PDU that caused the re-ordering timer to initiate on the reception side of the PDCP entity. The state variable may be a state variable referred to as RX_REORD described in NPL 11, or may be a state variable referred to as Reordering_PDCP_RX_COUNT described in NPL 5.

Note that in each embodiment of the present invention, in order to make a distinction between the E-UTRA protocol and the NR protocol, the MAC 202, the RLC 204, the PDCP

206, and the RRC 208 may be respectively referred to as a MAC for E-UTRA or a MAC for LTE, an RLC for E-UTRA or an RLC for LTE, a PDCP for E-UTRA or a PDCP for LTE, and an RRC for E-UTRA or an RRC for LTE. The MAC 302, the RLC 304, the PDCP 306, and the RRC 308 may also be referred to as MAC for NR, RLC for NR, RLC for NR, and RRC for NR, respectively. Alternatively, there may be descriptions using a space such as an E-UTRA PDCP or an LTE PDCP, an NR PDCP, and the like.

As illustrated in FIG. 1, the eNB 102, the gNB 108, the EPC 104, and the 5GC 110 may be connected to one another via the interface 112, the interface 116, the interface 118, the interface 120, and the interface 114. Thus, the RRC 208 in FIG. 2 may be replaced with the RRC 308 in FIG. 3 to support various communication systems. The PDCP 206 in FIG. 2 may also be replaced with the PDCP 306 in FIG. 3. The RRC 308 in FIG. 3 may include the function of the RRC 208 in FIG. 2. The PDCP 306 in FIG. 3 may be the PDCP 206 in FIG. 2. In the E-UTRA 100, the NR PDCP may be used as a PDCP even in a case that the UE 122 communicates with the eNB 102.

The state transition of the UE 122 in LTE and NR will now be described. The UE 122 connected to the EPC or the 5GC may be in an RRC_CONNECTED state in a case that an RRC connection has been established. The state in which the RRC connection has been established may include a state in which the UE 122 retains a part or all of UE contexts to be described later. The state in which the RRC connection has been established may include a state in which the UE 122 can transmit and/or receive unicast data. The UE 122 may be in an RRC_INACTIVE state in a case that the RRC connection is suspended (in a case that the UE 122 is connected to the 5GC). Otherwise, the UE 122 may be in an RRC_IDLE state.

Note that the UE 122 connected to the EPC does not have the RRC_INACTIVE state but that the E-UTRAN may initiate suspension of the RRC connection. In this case, in response to suspension of the RRC connection, the UE 122 transitions to the RRC_IDLE state while retaining an AS context of the UE and an identity used for resumption (resumeIdentity). In a case that the UE 122 retains the AS context of the UE and that the E-UTRAN permits the RRC connection to be resumed and that the UE 122 needs to transition from the RRC_IDLE state to the RRC_CONNECTED state, the resumption of the RRC connection suspended may be initiated by the higher layer (e.g., the NAS layer).

In other words, the definition of the suspension may vary between the UE 122 connected to the EPC and the UE 122 connected to the 5GC. All or a part of the procedures for the UE 122 to resume from suspension may be different between a case that the UE 122 is connected to the EPC (is suspended in the RRC_IDLE state) and a case that the UE 122 is connected to the 5GC (is suspended in the RRC_INACTIVE state).

Note that the RRC_CONNECTED state, the RRC_INACTIVE state, and the RRC_IDLE state may be respectively referred to as a connected state (connected mode), an inactive state (inactive mode), and an idle state (idle mode), or may be respectively referred to as an RRC connected state (RRC connected mode), an RRC inactive state (RRC inactive mode), and an RRC idle state (RRC idle mode).

The AS context of the UE retained by the UE 122 may be information including all or some of a current RRC configuration, a current security context, a PDCP state including a RObust Header Compression (ROHC) state, a Cell Radio Network Temporary Identifier (C-RNTI) used in a PCell of a connection source, a cell identity (cellIdentity), and a physical cell identity of the PCell of the connection source. Note that the AS context of the UE retained by one or all of the eNB 102 and the gNB 108 may include information identical to the information of the AS context of the UE retained by the UE 122, or may include information different from the information included in the AS context of the UE retained by the UE 122.

The security context may be information including all or some of a ciphering key at the AS level, a Next Hop parameter (NH), a Next Hop Chaining Counter parameter (NCC) used to derive an access key for the next hop, an identifier of a ciphering algorithm at a selected AS level, and a counter used for replay protection.

Next, the handover in LTE and NR will be described. The handover may be processing in which the UE 122 in the RRC connected state changes the serving cell. The handover may be performed in a case that the UE 122 receives an RRC message indicating handover from the eNB 102 and/or the gNB 108. The RRC message indicating handover may be a message related to reconfiguration of RRC connection including a parameter indicating handover (for example, an information element referred to as MobilityControlInfo described in NPL 4, or an information element referred to as Reconfiguration WithSync described in NPL 10), or may be a message indicating movement to a cell of another RAT (for example, MobilityFromEUTRACommand described in NPL 4, or MobilityFromNRCommand described in NPL 10). As a condition that the UE 122 can perform handover, a part or all of a case that AS security is activated, a case that the SRB2 is established, and a fact that at least one DRB is established may be included.

Figure 4:
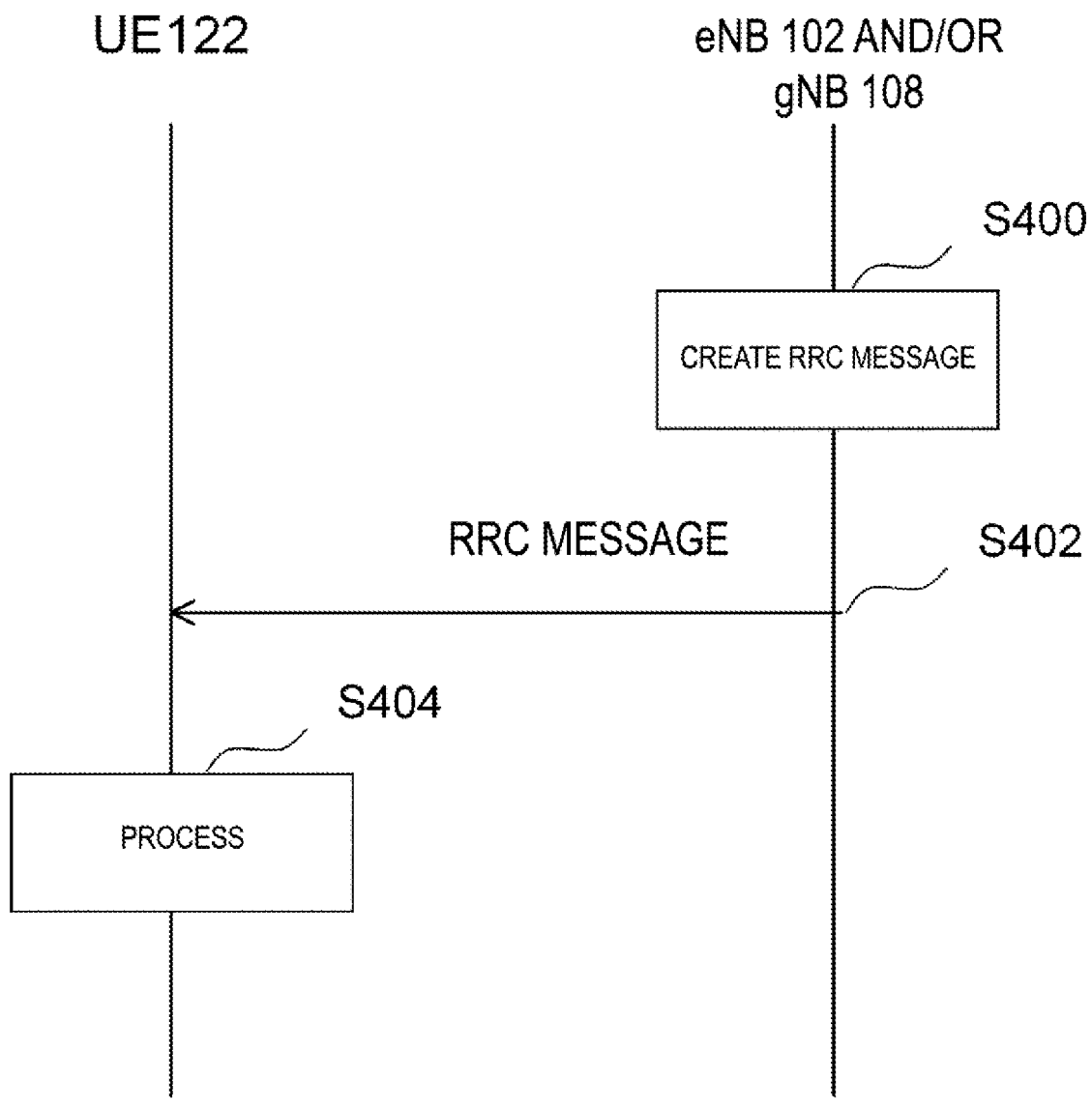
FIG. 4 is a diagram illustrating an example of a flow of a procedure for various configurations in an RRC 208 and/or an RRC 308 according to each embodiment of the present invention.

FIG. 4 is a diagram illustrating an example of a flow of a procedure for various configurations in the RRC 208 and/or the RRC 308 according to each embodiment of the present invention. FIG. 4 is an example of a flow in a case that an RRC message is transmitted from the base station apparatus (eNB 102 and/or gNB 108) to the terminal apparatus (UE 122).

In FIG. 4, the base station apparatus creates an RRC message (step S400). The creation of the RRC message in the base station apparatus may be performed in a case that the base station apparatus distributes broadcast information (System Information (SI)) or paging information, or in a case that the base station apparatus determines a need to cause a particular terminal apparatus to perform processing, for example, configuration related to security, reconfiguration of an RRC connection (processing (establishment, change, release, or the like) of the radio line bearer, processing (establishment, addition, change, release, or the like) of the cell group, measurement configuration, handover configuration, or the like), release of the RRC connected state, or the like. The RRC message may be used for a command for handover to a different RAT. The RRC message includes information (parameters) for various information notifications and configurations. In specifications related to RRC in NPL 4, NPL 10, or the like, the above-described parameters are referred to as fields and/or information elements, and are notated by using a notation method referred to as Abstract Syntax Notation One (ASN.1).

In FIG. 4, the base station apparatus then transmits the RRC message created, to the terminal apparatus (step S402). Then, in a case that processing such as a configuration is necessary in accordance with the RRC message received, the terminal apparatus performs the processing (step S404).

Note that the creation of the RRC message is not limited to the example described above, and may be performed for other purposes, as described in NPL 4, NPL 10, and the like.

For example, the RRC message may be used for configuration related to Dual Connectivity (DC) or Multi-Radio Dual Connectivity (MR-DC) described in NPL 8.

The Dual Connectivity (DC) may be a technology for performing data communication by using radio resources of both cell groups including two base station apparatuses (nodes), that are a master cell group (MCG) including master nodes (MNs) and a secondary cell group (SCG) including secondary nodes (SNs). The master node and the secondary node may be an identical node (identical base station apparatus). As described in NPL 8, the MR-DC may be a technology in which cells of both Radio Access Technologies (RATs) of E-UTRA and NR are formed into cell groups for each RAT, which are assigned to the UE, and in which data communication is performed by utilizing radio resources of both MCG and SCG, or may be Dual Connectivity (DC) using the RAT of NR. In the MR-DC, the master node may be a base station including primary RRC functions related to MR-DC, for example, functions to add a secondary node, to establish, change, and release an RB, to add, change, and release an MCG, and to perform handover and the like, and the secondary node may be a base station including some RRC functions, for example, functions to change and release an SCG, and the like.

In the MR-DC described in NPL 8, the RRC corresponding to the master node side RAT may be used to configure both the MCG and the SCG. For example, in E-UTRA-NR Dual Connectivity (EN-DC) corresponding to the MR-DC in which the EPC 104 is used as a core network and the eNB 102 (also referred to as an evolved eNB 102) is used as a master node and in NG-RAN E-UTRA-NR Dual Connectivity (NGEN-DC) corresponding to the MR-DC in which the 5GC 110 is used as a core network and the eNB 102 is used as a master node, an RRC message for E-UTRA described in NPL 4 may be transmitted and received between the eNB 102 and the UE 122. In this case, the RRC message may include NR configuration information described in NPL 10 as well as LTE (E-UTRA) configuration information. The RRC message transmitted from the eNB 102 to the UE 122 may be transmitted from the eNB 102 to the UE 122 via the gNB 108. The configuration of the present RRC message may be used in E-UTRA/5GC in which the eNB 102 (evolved eNB) uses the 5GC as a core network.

In contrast, in the MR-DC described in NPL 8, in NR-E-UTRA Dual Connectivity (NE-DC) corresponding to the MR-DC in which the 5GC 110 is used as a core network and the gNB 108 is used as a master node, an RRC message for NR described in NPL 10 may be transmitted and received between the gNB 108 and the UE 122. In this case, the RRC message may include LTE (E-UTRA) configuration information described in NPL 4 as well as NR configuration information. The RRC message transmitted from the gNB 108 to the UE 122 may be transmitted from the gNB 108 to the UE 122 via the eNB 102.

Note that the embodiment is not limited to the case of utilization of the MR-DC and that the RRC message for E-UTRA transmitted from the eNB 102 to the UE 122 may include an RRC message for NR, whereas the RRC message for NR transmitted from the gNB 108 to the UE 122 may include an RRC message for E-UTRA.

A network configuration in which the eNB 102 is used as a master node and the EPC 104 is used as a core network may be referred to as E-UTRA/EPC. A network configuration in which the eNB 102 is used as a master node and the 5GC 110 is used as a core network may be referred to as E-UTRA/5GC. A network configuration in which the gNB 108 is used as a master node and the 5GC 110 is used as a core network may be referred to as NR or NR/5GC. This designation need not be limited to a case where the DC is configured. In the case that the DC is not configured, the above-described master node may refer to a base station apparatus that communicates with the terminal apparatus.

FIG. 7 illustrates an example of an ASN.1 notation representing a field and/or an information element related to a radio bearer configuration included in a message related to reconfiguration of RRC connection in NR in FIG. 4. FIG. 8 illustrates an example of an ASN.1 notation representing a field and/or an information element related to a radio bearer configuration included in a message related to reconfiguration of RRC connection in E-UTRA in FIG. 4. In an example of ASN.1 illustrated also in other drawings than FIGS. 7 and 8 according to the embodiment of the present invention, <omitted> and <partly omitted> are not part of the notation of ASN.1 and mean that other information is omitted. Note that there may also be omitted information elements in a part where neither <omitted> nor <partly omitted> is indicated. Note that, in an embodiment of the present invention, the examples of ASN.1 do not correctly follow the ASN.1 notation method but represent examples of parameters of a message for reconfiguration of RRC connection according to an embodiment of the present invention and that any other designation and any other notation may be used. The examples of ASN.1 correspond to only examples related to main information closely associated with an aspect of the present invention in order to avoid complicated description. Note that the parameters notated in ASN.1 may all be referred to as information elements without distinction between fields, information elements, or the like. In an embodiment of the present invention, the parameters such as fields and information elements notated in ASN.1, the parameters being included in the RRC message, may also be referred to as information. Note that the message related to reconfiguration of RRC connection may be an RRC reconfiguration message in NR or an RRC connection reconfiguration message in E-UTRA.

In FIG. 7, the information element represented by Radio-BearerConfig is an information element related to configurations of radio bearers such as SRBs or DRBs and include PDCP configuration information elements and SDAP configuration information elements to be described later. An information element represented by SRB-ToAddMod and included in the information elements represented by Radio-BearerConfig may be information indicating a signaling radio bearer (SRB) configuration, and may also be interpreted as an SRB configuration information element or a signaling radio bearer configuration information element. An information element represented by SRB-ToAddMod-List may be a list of pieces of information indicating SRB configurations. An information element represented by DRB-ToAddMod and included in the information elements represented by RadioBearerConfig may be information indicating a data radio bearer (DRB) configuration, and may also be interpreted as a DRB configuration information element or a data radio bearer configuration information element. An information element represented by DRB-ToAddModList may be a list of pieces of information indicating DRB configurations. Note that any or all of the SRB configurations and the DRB configurations may also be interpreted as radio bearer configurations.

An information element included in the SRB configuration information elements and represented by SRB-Identity is information of SRB identity of an SRB to be added or changed, and may be an identifier that uniquely identifies the SRB at each terminal apparatus. The information element included in the SRB configuration information elements and represented by SRB-Identity may also be interpreted as an SRB identity information element, a radio bearer identity information element, or a signaling radio bearer identity information element.

An information element included in the DRB configuration information elements and represented by DRB-Identity is an information of DRB identity of a DRB to be added or changed, and may be an identifier that uniquely identifies the DRB at each terminal apparatus. The information element included in the DRB configuration information elements and represented by DRB-Identity may also be interpreted as a DRB identity information element, a radio bearer identity information element, or a data radio bearer identity information element. In the example illustrated in FIG. 7, the DRB identity has an integer value ranging from 1 to 32. However, the DRB identity may take another value. For DC, the DRB identity is unique within the scope of the UE 122.

An information element included in the DRB configuration information elements and represented by cnAssociation may be an information element indicating whether the EPC 104 or the 5GC 110 is used as a core network, and may also be interpreted as a core network association information element. In other words, in a case that the UE 122 is connected to the EPC, the DRB may be associated with an EPS bearer identity information element (eps-BearerIdentity) in cnAssociation or with an EPS bearer identity corresponding to the value of the EPS bearer identity information element. In a case that the UE 122 is connected to the 5GC 110, the DRB may be associated with an SDAP entity configured in accordance with an SDAP configuration information element (sdap-Config) described below, or a PDU session information element described below and included in the SDAP configuration information element, or a PDU session identity corresponding to the value of the PDU session information element, or a PDU session indicated by the PDU session information element. In other words, the information represented by cnAssociation may include an EPS bearer identity information element (eps-BearerIdentity) in a case that the EPC 104 is used as a core network, such as in a case of using EN-DC, and may include an information element (sdap-Config) indicating an SDAP configuration in a case that the 5GC 110 is used as a core network, in other words, in a case of not using EN-DC.

The information element represented by sdap-Config may be information related to a configuration or reconfiguration of the SDAP entity that determines a mapping method between the QoS flow and the DRB in a case that the 5GC 110 is used as a core network, and may also be interpreted as an SDAP configuration information element.

A field or an information element included in the SDAP configuration information elements and represented by pdu-session or PDU-SessionID may be the PDU session identity of a PDU session described in NPL 2 and to which the QoS flow mapped to the radio bearer corresponding to the value of the radio bearer identity information element belongs, the radio bearer identity information element being included in the DRB configuration information elements including the present SDAP configuration information element, and may also be interpreted as a PDU session identity information element. The value of the PDU session identity information element may be an integer that is not negative. At each of the terminal apparatuses, multiple DRB identities may correspond to one PDU session identity.

An information element included in the SDAP configuration information elements and indicated by mappedQoS-FlowsToAdd may be information indicating a list of QoS flow identity (QFI) information elements described below of QoS flows to be mapped to or additionally mapped to the radio bearer corresponding to the value of the radio bearer identity information element included in the DRB configuration information elements including the present SDAP configuration information elements, and may also be interpreted as an added QoS flow information element. The QoS flow described above may be a QoS flow of a PDU session indicated by the PDU session information element included in the present SDAP configuration information elements.

An information element included in the SDAP configuration information elements and indicated by mappedQoS-FlowsToRelease may be information indicating a list of QoS flow identity (QFI) information elements described below of QoS flows from which a mapping relationship is to be released and which are included in the QoS flows mapped to the radio bearer corresponding to the value of the radio bearer identity information element included in the DRB configuration information elements including the present SDAP configuration information elements, and may also be interpreted as a released QoS flow information element. The QoS flow described above may be a QoS flow of a PDU session indicated by the PDU session information element included in the present SDAP configuration information elements.

An information element indicated by QFI may be a QoS flow identity described in NPL 2 and uniquely identifying a QoS flow, and may be replaced with a QoS flow identity information element. The value of the QoS flow identity information element may be a non-negative integer. The value of the QoS flow identity information element may be unique to the PDU session.

The SDAP configuration information elements may include, in addition to the above-described information elements, an uplink header information element indicating whether an uplink SDAP header is present in uplink data transmitted via the configured DRB, a downlink header information element indicating whether a downlink SDAP header is present in downlink data received via the configured DRB, a default bearer information element indicating whether the configured DRB is a default radio bearer (default DRB), and the like.

Information elements included in the SRB configuration information elements and the DRB configuration information elements and represented by pdcp-Config or PDCP-Config may be information elements used to establish or change the PDCP 306 for the SRB and/or the DRB and related to the configuration of an NR PDCP entity, and may also be interpreted as PDCP configuration information elements. The information elements related to the configuration of the NR PDCP entity include an information element indicating the size of an uplink sequence number, an information element indicating the size of a downlink sequence number, an information element indicating a profile of header compression (RObust Header Compression (RoHC)), a re-ordering timer information element, and the like.

An information element represented by DRB-ToReleaseList and included in the information elements represented by RadioBearerConfig may include information indicating one or more DRB identities to be released.

In FIG. 8, an information element represented by RadioResourceConfigDedicated may be an information element used for configuration, change, release, or the like of the radio bearer. An information element represented by SRB-ToAddMod and included in the information elements represented by RadioResourceConfigDedicated may be information indicating a signaling radio bearer (SRB) configuration, and may also be interpreted as an SRB configuration information element or a signaling radio bearer configuration information element. An information element represented by SRB-ToAddModList may be a list of piece of information indicating SRB configurations. An information element represented by DRB-ToAddMod and included in the information elements represented by RadioResourceConfigDedicated may be information indicating a data radio bearer (DRB) configuration, and may also be interpreted as a DRB configuration information element or a data radio bearer configuration information element. An information element represented by DRB-ToAddModList may be a list of pieces of information indicating DRB configurations. Note that any or all of the SRB configurations and the DRB configurations may also be interpreted as radio bearer configurations.

An information element included in the SRB configuration information elements and represented by SRB-Identity is information of SRB identity of an SRB to be added or changed, and may be an identifier that uniquely identifies the SRB at each terminal apparatus. The information element included in the SRB configuration information elements and represented by SRB-Identity may also be interpreted as an SRB identity information element, a radio bearer identity information element, or a signaling radio bearer identity information element. An information element represented by SRB-Identity in FIG. 8 may be an information element having a role identical to the role of the information element represented by SRB-Identity in FIG. 7.

An information element included in the DRB configurations and represented by DRB-Identity may be information of DRB identity of a DRB to be added or changed and may be a DRB identity uniquely identifying, at each terminal apparatus, the DRB. The information element included in the DRB configurations and represented by DRB-Identity may also be interpreted as a DRB identity information element, a radio bearer identity information element, or a data radio bearer identity information element. In the example illustrated in FIG. 8, the DRB Identity has an integer value ranging from 1 to 32. However, the DRB identity may take another value. The information element represented by DRB-Identity in FIG. 8 may be an information element having a role identical to the role of the information element represented by DRB-Identity in FIG. 7.

An information element included in the DRB configuration information elements and represented by eps-BearerIdentity may be an EPS bearer identity uniquely identifying an EPS bearer at each terminal apparatus. The information element represented by eps-BearerIdentity may be referred to as an EPS bearer identity information element. In the example illustrated in FIG. 8, the EPS bearer Identity has an integer value ranging from 1 to 15. However, the EPS bearer identity may take another value. The information element represented by eps-BearerIdentity in FIG. 8 may be an information element having a role identical to the role of the information element represented by eps-BearerIdentity in FIG. 7. At each terminal apparatus, the EPS bearer identities may correspond to the DRB identities on a one-to-one basis.

An information element included in the SRB configuration information elements and the DRB configuration information elements and represented by pdcp-Config or PDCP-Config may be an information element related to the configuration of an E-UTRA PDCP entity and used to establish or change the PDCP 206 for the SRB and/or for the DRB, and may also be interpreted as a PDCP configuration information element. The information elements related to the configuration of the E-UTRA PDCP entity may include an information element indicating the size of the sequence number, an information element indicating the profile of header compression (RObust Header Compression (RoHC)), a re-ordering timer information element, and the like.

Some or all of the information elements illustrated in FIG. 7 or FIG. 8 may be optional. In other words, the information elements illustrated in FIG. 7 or FIG. 8 may be included in a message related to the reconfiguration of RRC connection depending on requirements or conditions. The message related to the reconfiguration of RRC connection may include an information element meaning that a full configuration is to be applied, in addition to an information element related to the configuration of the radio bearer. The information element meaning that the full configuration is to be applied may be represented by an information element name such as fullConfig, and true, enable, or the like may be used to indicate application of the full configuration.

An information element represented by DRB-ToReleaseList and included in the information elements represented by RadioResourceConfigDedicated may include information indicating one or more DRB identities to be released.

In a case that RRC connection is established, in a case that the RRC connection is re-established, or in a case of handover, one serving cell provides mobility information for the NAS. In a case that the RRC connection is re-established or in a case of handover, one serving cell provides a security input. The serving cell may be referenced as a primary cell (PCell). Depending on the capability of the terminal apparatus, one or multiple serving cells (secondary cells, SCells) may be additionally configured together with the primary cell.

A set of serving cells including two subsets may be configured for the terminal apparatus. The two subsets may include a cell group (master cell group) including one or multiple serving cells including the primary cell (PCell), and one or multiple cell groups (secondary cell groups) each including one or multiple serving cells including a primary secondary cell (PSCell) and no primary cell. The primary secondary cell may be a cell configured with a PUCCH resource. Note that the PCell and/or the PSCell may be referred to as a special cell (SpCell).

Various embodiments of the present invention will be described based on the foregoing description. Note that, for each of the steps of processing omitted in the following description, each of the steps of processing described above may be applied.

Figure 5:
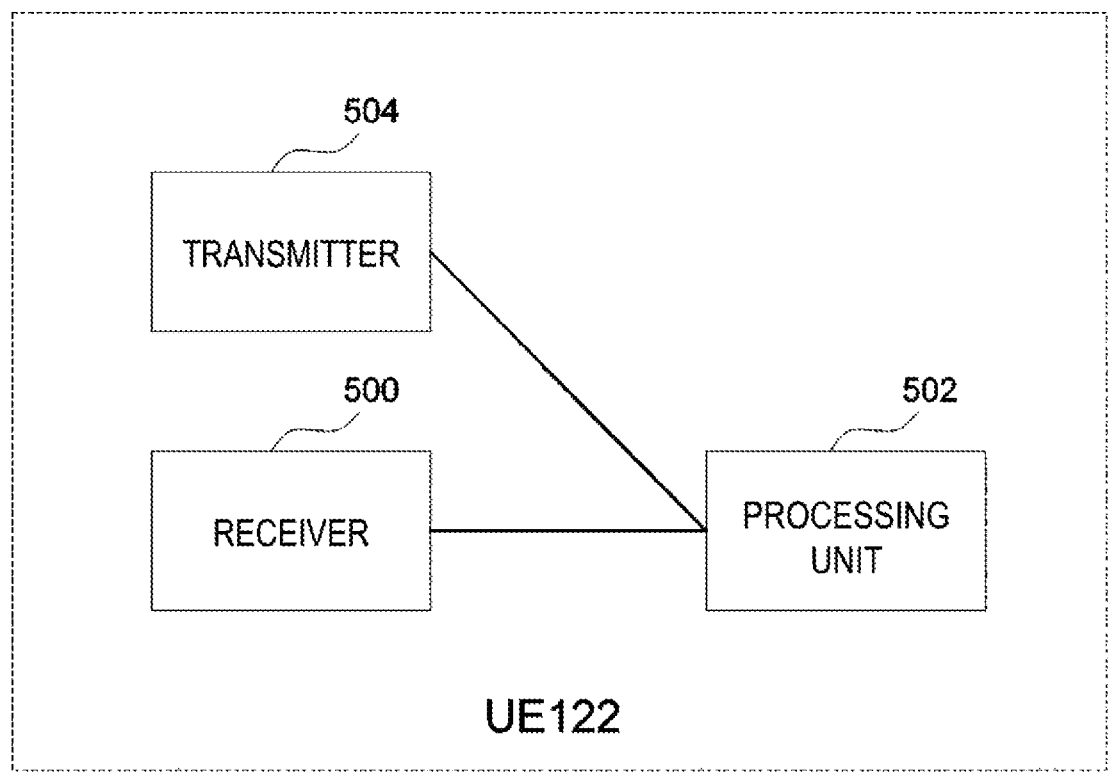
FIG. 5 is a block diagram illustrating a configuration of the terminal apparatus according to each embodiment of the present invention.

FIG. 5 is a block diagram illustrating a configuration of the terminal apparatus (UE 122) according to each embodiment of the present invention. Note that FIG. 5 illustrates only the main components closely related to an aspect of the present invention in order to avoid complexity of description.

The UE 122 illustrated in FIG. 5 includes a receiver 500 configured to receive an RRC message and the like from a base station apparatus, a processing unit 502 configured to perform processing in accordance with any or all of pieces of configuration information such as various information elements (IEs), various fields, and various conditions included in the message received, and a transmitter 504 configured to transmit the RRC message and the like to the base station apparatus. The above-described base station apparatus may be the eNB 102 or the gNB 108. The processing unit 502 may include some or all of the functions of various layers (e.g., a physical layer, a MAC layer, an RLC layer, a PDCP layer, an RRC layer, and an NAS layer). In other words, the processing unit 502 may include some or all of a physical layer processing unit, a MAC layer processing unit, an RLC layer processing unit, a PDCP layer processing unit, an RRC layer processing unit, and an NAS layer processing unit.

Figure 6:
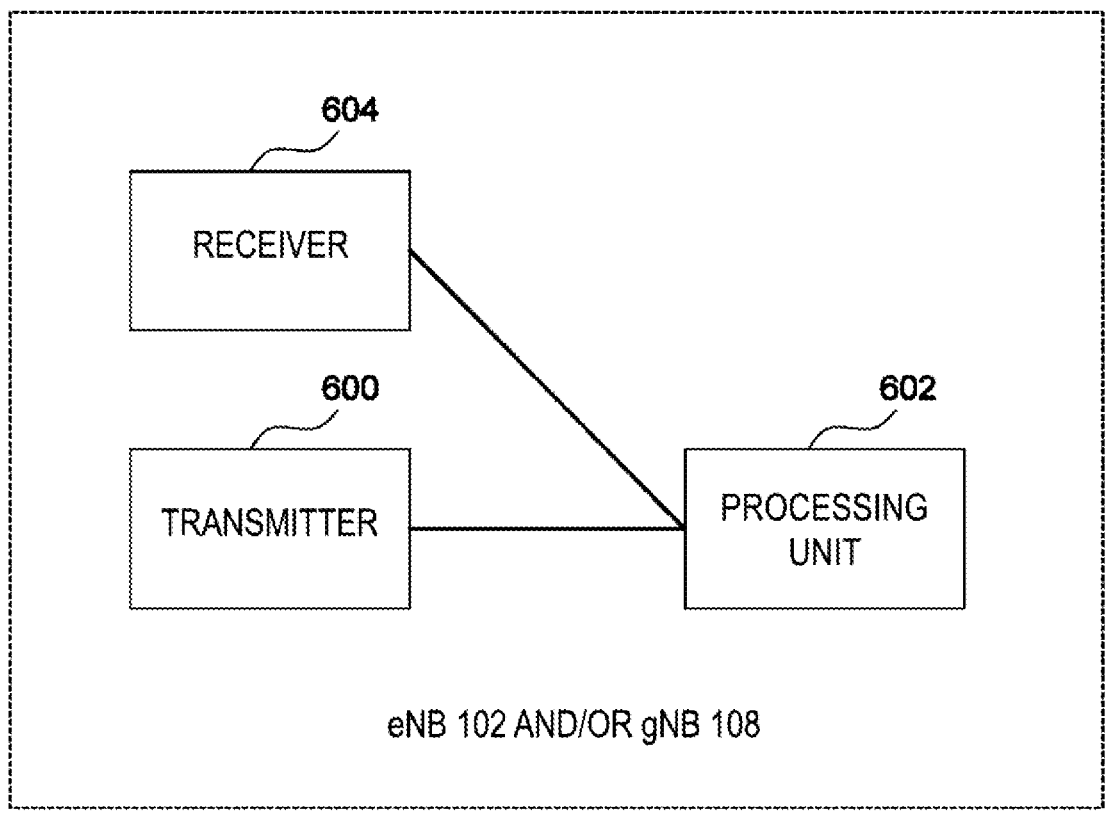
FIG. 6 is a block diagram illustrating a configuration of the base station apparatus according to each embodiment of the present invention.

FIG. 6 is a block diagram illustrating a configuration of the base station apparatus according to each embodiment of the present invention. Note that FIG. 6 illustrates only the main components closely related to one aspect of the present invention in order to avoid complexity of description. The above-described base station apparatus may be the eNB 102 or the gNB 108.

The base station apparatus illustrated in FIG. 6 includes a transmitter 600 configured to transmit an RRC message and the like to the UE 122, a processing unit 602 configured to create an RRC message including any or all of pieces of configuration information such as various information elements (IEs), various fields, and various conditions and to transmit the RRC message to the UE 122 to cause the processing unit 502 of the UE 122 to perform processing, and a receiver 604 configured to receive the RRC message and the like from the UE 122. The processing unit 602 may include some or all of the functions of various layers (e.g., the physical layer, the MAC layer, the RLC layer, the PDCP layer, the RRC layer, and the NAS layer). In other words, the processing unit 602 may include some or all of the physical layer processing unit, the MAC layer processing unit, the RLC layer processing unit, the PDCP layer processing unit, the RRC layer processing unit, and the NAS layer processing unit.

Figure 9:
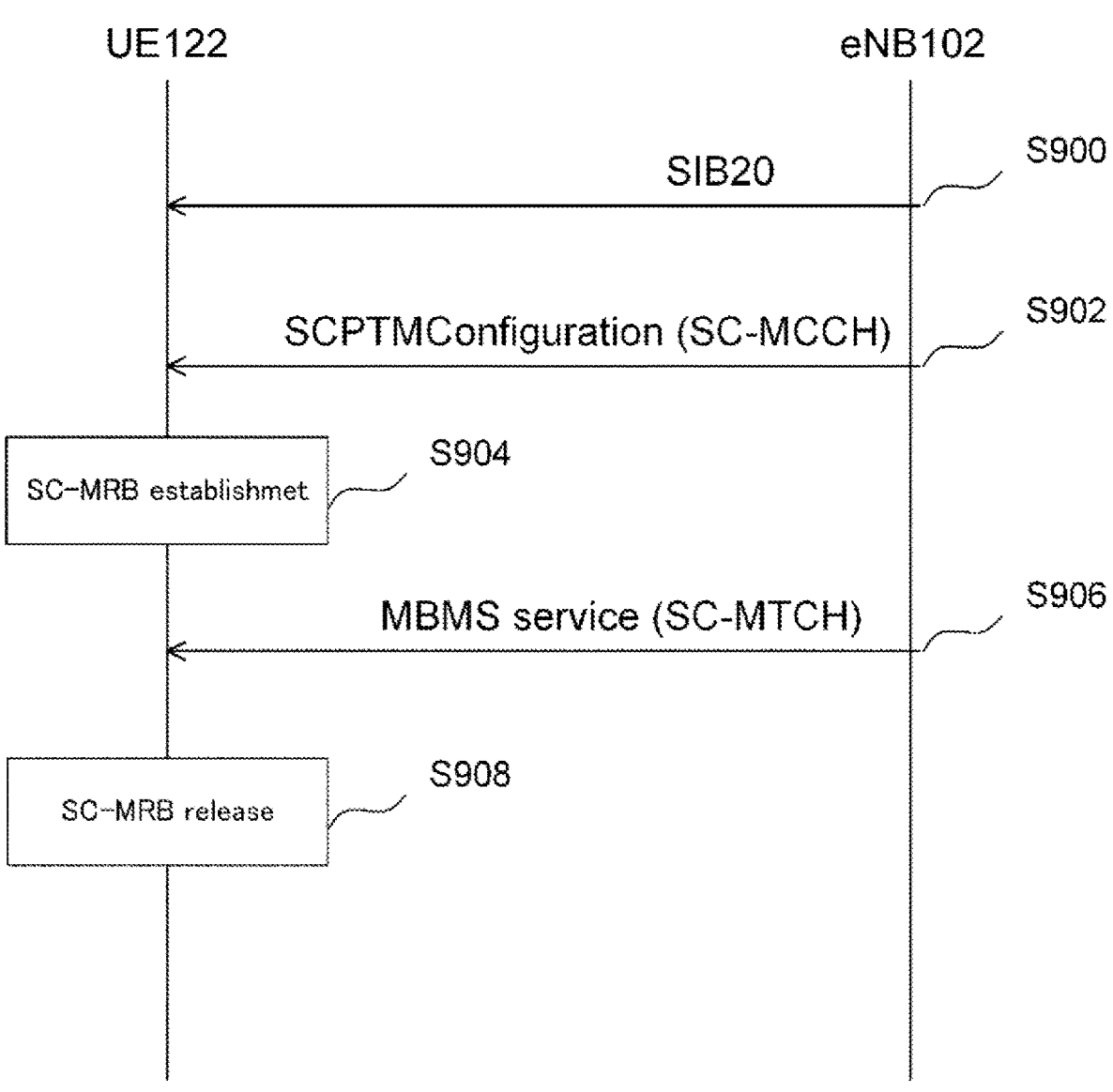
FIG. 9 is a diagram illustrating a flow of a procedure for configuration of MBMS reception using an SC-PTM.

With reference to FIG. 9 to FIG. 11, an overview of operations of MBMS transmission/reception using the SC-PTM will be described. Note that an MBMS, an MBMS service, and an MBMS session, which are terms to be used in the following description, may be terms having the same meanings and may be replaced with each other.

FIG. 9 is a diagram illustrating a flow of a procedure for configuration of MBMS reception using the SC-PTM. FIG. 10 is a diagram illustrating an example of ASN.1 notation representing fields and/or information elements included in System Information Block Type 20 (SIB20) of FIG. 9. FIG. 11 is a diagram illustrating an example of ASN.1 notation representing fields and/or information elements included in an SC-PTM configuration message (SCPTMConfiguration) of FIG. 9.

As illustrated in FIG. 9, the processing unit 602 of the eNB 102 creates the System Information Block type 20 (SIB20) being an RRC message, and transmits the SIB20 from the transmitter 600 to the UE 122 via the BCCH. The receiver 500 of the UE 122 receives the SIB20. (Step S900).

As described in NPL 4, the SIB20 includes information necessary for acquisition of control information (specifically, the SC-MCCH) related to transmission of the MBMS using the SC-PTM. For example, the SIB20 includes a part or all of fields, such as a field represented by sc-mcch-ModificationPeriod indicating a period for which details of the SC-MCCH may be changed, a field represented by sc-mcch-RepetitionPeriod indicating a transmission (re-transmission) time interval of the SC-MCCH with the number of radio frames, a field represented by sc-mech-Offset indicating an offset of the radio frame in which the SC-MCCH is scheduled, a field represented by sc-mcch-First-Subframe indicating the subframe in which the SC-MCCH is scheduled, and a field represented by sc-mcch-duration indicating a period of the subframe in which the SC-MCCH is scheduled, and/or information elements.

Next, the processing unit of the eNB 102 creates an SC-PTM configuration message (SCPTM Configuration) being an RRC message, and transmits the SC-PTM configuration message from the transmitter 600 via the SC-MCCH. The receiver 500 of the UE 122 receives SC-PTM configuration information, based on the configuration of the SIB20. In the physical layer, a Single Cell RNTI (SC-RNTI) is used for transmission of the SC-MCCH. (Step S902).

As described in NPL 4, the SC-PTM configuration information includes control information that can be applied to MBMS reception. For example, the SC-PTM configuration information includes a part or all of fields, such as a field represented by sc-mtch-InfoList including the configuration of each SC-MTCH in a cell for transmitting the information and a field represented by scptm-NeighbourCellList being a list of neighboring cells that provide the MBMS, and/or information elements.

sc-mtch-InfoList includes one or multiple information elements represented by SC-MTCH-Info. Each SC-MTCH-Info includes a part or all of fields, such as a field represented by mbmsSessionInfo being information of the MBMS session, a field represented by g-RNTI being a Radio Network Temporary Identifier (RNTI) for identifying a multicast group (specifically, the SC-MTCH addressed to a specific group), a field represented by sc-mtch-schedulingInfo being DRX information for SC-MTCH, and a field represented by sc-mtch-neighbourCell being information of a neighboring cell from which the MBMS session can be received using the SC-MTCH. mbmsSessionInfo includes a part or all of fields, such as a field represented by tmgi being a Temporary Mobile Group Identity (TMGI), which is an identifier for identifying an MBMS bearer service, described in NPL 15 and the like and a field represented by sessionId being an identifier of the MBMS session described in NPL 15 and the like.

In order to initiate reception of the MBMS session in which the processing unit 502 of the UE 122 is interested, the processing unit 502 may perform Single Cell MBMS Point to Multipoint Radio Bearer (SC-MRB) establishment processing, the SC-MRB being a radio bearer for MBMS session reception using the SC-PTM (Step S904). For example, the SC-MRB establishment processing may be started in a case of initiating the MBMS session, a case that the UE 122 enters a cell where the MBMS service in which the UE 122 is interested is provided via the SC-MRB, a case of starting to take an interest in the MBMS service, a case that a restriction on UE capability that has restricted reception of the MBMS service is removed, and the like. The SC-MRB establishment processing may be performed in a case that the UE 122 is in the RRC_IDLE state, or may be performed in a case that the UE 122 is in the RRC_CON-NECTED state. In a case of performing the SC-MRB establishment processing, the processing unit 502 of the UE 122 may perform a part or all of the following processing of (A) to (D):

(A) establish the RLC entity according to a default configuration of the SC-MCCH and the SC-MTCH;

(B) configure an SC-MTCH logical channel to be applied to the SC-MRB to be established, and instruct the MAC entity so as to receive the MBMS session according to the SC-PTM configuration message for a cell in which the SC-PTM configuration message is received;

(C) configure the physical layer for the SC-MRB to be established, based on sc-mtch-InfoList described above;

(D) notify a higher layer of tmgi and sessionId corresponding to the established SC-MRB and thereby notify the higher layer of establishment of the SC-MRB.

The processing unit 502 of the UE 122 receives the MBMS session via the established SC-MRB according to the SC-PTM configuration message (Step S906). Before receiving the MBMS session, the processing unit 502 of the UE 122 may create an MBMS interest notification message (MBMSInterestIndication), which is for notifying the eNB 102 that the UE 122 is to receive or is interested in receiving the MBMS service via the SC-MRB, and transmit the MBMS interest notification message from the transmitter 504 to the eNB 102 (not illustrated). The MBMS interest notification message may include information as to whether to prioritize MBMS service reception over unicast reception. The MBMS interest notification message may be transmitted after the SIB20 is received, in a case of transition to the RRC_CONNECTED state, or after transition to the RRC_CONNECTED state. The MBMS interest notification message may be transmitted in a case that the SIB20 is received in handover, or may be transmitted in a case that the SIB20 is received in re-establishment of the RRC connection.

The processing unit 502 of the UE 122 may perform SC-MRB release processing in order to stop reception of the MBMS session (Step S908). For example, the SC-MRB release processing may be started in a case of stopping the MBMS session being received, a case of leaving from a cell in which the SC-MRB is established, a case that the interest in the MBMS service is lost, a case that reception of the MBMS service is restricted due to the restriction on the UE capability, and the like. The SC-MRB release processing may be performed in a case that the UE 122 is in the RRC_IDLE state, or may be performed in a case that the UE 122 is in the RRC_CONNECTED state. In a case of performing the SC-MRB release processing, the processing unit 502 of the UE 122 may perform a part or all of the following processing of (A) to (B):

(A) release a physical layer configuration with the RLC entity of the SC-MRB to be released and the MAC related thereto;

(B) notify a higher layer of tmgi and sessionId corresponding to the released SC-MRB and thereby notify the higher layer of release of the SC-MRB.

In the above, an overview of operations related to the configuration of MBMS reception using the SC-PTM has been described. As described in NPL 4 and the like, MBMS transmission/reception using the MBSFN has also been standardized in addition to MBMS transmission from the base station apparatus/MBMS reception in the terminal apparatus using the SC-PTM (hereinafter referred to as MBMS transmission/reception). However, the MBMS transmission/reception using the SC-PTM and the MBMS transmission/reception using the MBSFN described in NPL 4 use E-UTRA as their RATs. Multicast Broadcast Service (MBS) transmission/reception using NR as its RAT has not yet been standardized.

Figure 13:
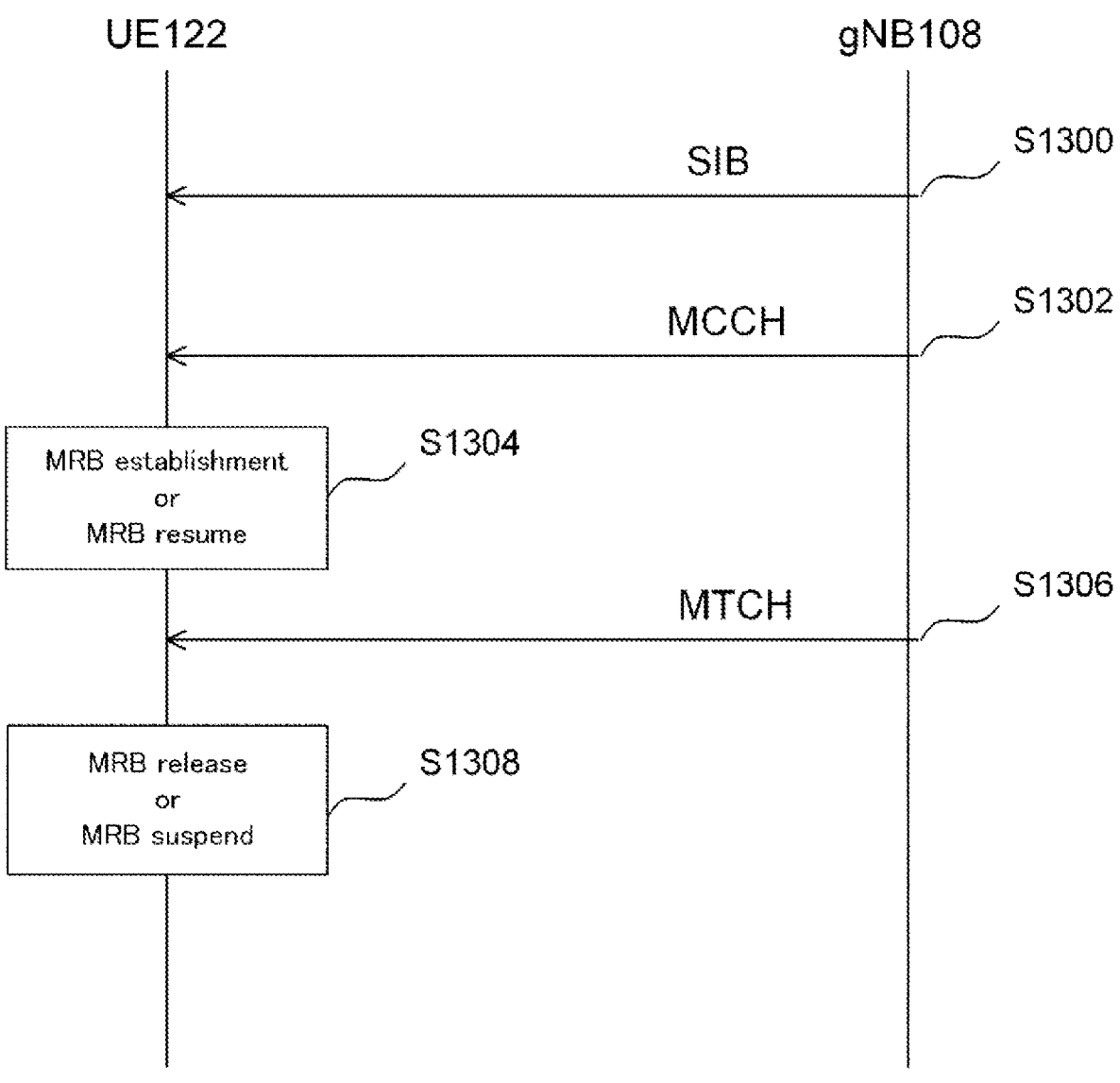
FIG. 13 is a diagram illustrating an example of a flow of a procedure for configuration of MBS reception in NR according to an embodiment of the present invention.

With reference to FIG. 12 to FIG. 13, an example of operations related to a configuration of MBS reception according to an embodiment of the present invention will be described. Note that an MBS, an MBS service, and an MBS session, which are terms to be used in an embodiment of the present invention, may be terms having the same meanings and may be replaced with each other. The MBS, the MBS service, and the MBS session, which are terms to be used in an embodiment of the present invention, may be terms having the same meanings as the MBMS, the MBMS service, and the MBMS session described in NPL 4 and the like. In an embodiment of the present invention, the MBS Radio Bearer (MRB) may be a radio bearer established in the UE 122 for MBS reception. The MRB may be a radio bearer established in the gNB 108 for MBS transmission. In an embodiment of the present invention, the radio bearer for MBS receptions is described using the term "MRB", but other terms may be used. In an embodiment of the present invention, the MRB may include an MRB for receiving and/or transmitting the MBS on a Point-to-Multipoint basis, or an MRB for receiving and/or transmitting the MBS on a Point-to-Point basis. The receiving and/or transmitting an MBS on a point-to-multipoint basis may be receiving and/or transmitting an MBS via the multicast logical channel such as the MTCH and the SC-MTCH. The receiving and/or transmitting an MBS on a point-to-point basis may be receiving and/or transmitting an MBS via the dedicated user data logical channel such as the DTCH. In an embodiment of the present invention, an operation for switching a mode of receiving and/or transmitting an MBS on a point-to-multipoint basis to a mode of receiving and/or transmitting the MBS on a point-to-point basis is involved. In an embodiment of the present invention, an operation for switching the mode of receiving and/or transmitting an MBS on a point-to-point basis to the mode of receiving and/or transmitting the MBS on a point-to-multipoint basis is involved. Note that, in an embodiment of the present invention, the receiving and/or transmitting an MBS in one-to-many may be interpreted as receiving and/or transmitting an MBS on a point-to-multipoint basis or receiving and/or transmitting an MBS in multicast. In an embodiment of the present invention, the receiving and/or transmitting an MBS in one-to-one may be interpreted as receiving and/or transmitting an MBS on a point-to-point basis or receiving and/or transmitting an MBS in unicast.

FIG. 12 is a diagram illustrating an example illustrating a configuration of the SDAP sublayer according to an embodiment of the present invention. (A) of FIG. 12 is an example in which an RLC-Service Access Point (RLC-SAP) is present between the SDAP sublayer and the RLC sublayer. In the example of (A) of FIG. 12, in the UE 122, data of the MBS session received via the MRB may be delivered to the SDAP entity as the RLC SDU in the RLC entity of the MRB. In the example of FIG. 12(A), in the gNB 108, regarding data of the MBS session transmitted from the core network, in the SDAP entity of the gNB 108, the QoS flow linked to the data of the MBS session and the MRB may be mapped to each other, and this may be submitted to the RLC entity of the mapped MRB as the SDAP PDU.

(B) of FIG. 12 is an example in which a PDCP-Service Access Point (PDCP-SAP) is present between the SDAP sublayer and the PDCP sublayer. In the example of (B) of FIG. 12, in the UE 122, data of the MBS session received via the MRB may be delivered to the PDCP entity of the MRB as the RLC SDU in the RLC entity of the MRB. The PDCP entity to which the RLC SDU is delivered may perform no processing on the delivered RLC SDU, that is, the PDCP PDU, and directly deliver it to the SDAP entity as the PDCP SDU. In the example of FIG. 12(B), in the gNB 108, regarding data of the MBS session transmitted from the core network, in the SDAP entity of the gNB 108, the QoS flow linked to the data of the MBS session and the MRB may be mapped to each other, and this may be submitted to the PDCP entity of the mapped MRB as the SDAP PDU. The PDCP entity to which the SDAP PDU is delivered may perform no processing on the delivered SDAP PDU, that is, the PDCP SDU, and directly deliver it to the RLC entity of the MRB as the PDCP PDU. In other words, in the example of FIG. 12(B), the PDCP entity may be present as a transparent entity that performs no processing. In the example of FIG. 12(B), the PDCP entity may be present as an entity that performs a part of processing of the PDCP sublayer.

Note that "to be linked" may be interpreted as "to be bundled", or may be interpreted as other similar terms. "To be associated" may be interpreted as "to be mapped", or may be interpreted as other similar terms.

Here, a relationship between the MRB, the SDAP entity, and the PDU session according to an embodiment of the present invention will be described. The SDAP entity associated with the MRB may be associated with one or multiple DRBs. In other words, the PDU session and/or the SDAP entity may be established and/or configured in common to the MBS service and the unicast service. One PDU session may correspond to the MBS service and the unicast service, and provide the MBS service and/or the unicast service. One SDAP entity common to the MBS service and the unicast service may be established and/or configured for one PDU session. In a case that one PDU session corresponds to the MBS service and the unicast service and provides the MBS service and/or the unicast service, the SDAP entity associated with the MRB may be for the MBS service, and may not be associated with the DRB for the unicast service. Each of one SDAP entity for the MBS service (for MRB) and one SDAP entity for the unicast service (for DRB) may be established and/or configured for one PDU session. The PDU session for the MBS service may be present separately from the PDU session for the unicast service. One SDAP entity for the MBS service may be established and/or configured for the PDU session for the MBS service. The SDAP entity need not be established and/or configured for the PDU session for the MBS service. In a case that the SDAP entity is not established and/or configured for the PDU session for the MBS service, the QoS flow and the MRB may not be mapped to each other in the gNB. In the case that one PDU session corresponds to the MBS service and the unicast service and provides the MBS service and/or the unicast service, at least one MRB and/or at least one DRB may be established for the PDU session. At least one MRB may be established for the PDU session for the MBS service. The SDAP entity associated with the MRB may be established and/or configured in a case that the UE 122 transitions from the RRC_IDLE state to the RRC_CON-NECTED state, or in a case that the UE 122 transitions from the RRC_INACTIVE state to the RRC_CONNECTED state. The SDAP entity associated with the MRB may be established and/or configured in a case that the UE 122 is in the RRC_INACTIVE state and/or the RRC_CONNECTED state. Note that other terms than the PDU session may be used to refer to the PDU session for the MBS service.

FIG. 13 is a diagram illustrating an example of a flow of a procedure for configuration of MBS reception in NR according to an embodiment of the present invention. Note that, in the present embodiment, parameters may refer to fields and/or information elements in ASN.1.

As illustrated in FIG. 13, in order to broadcast information necessary for acquisition of control information related to the MBS transmission, the processing unit 602 of the gNB 108 may create a first System Information Block (SIB) being one of the RRC messages, and transmit the first SIB from the transmitter 600 to the UE 122. The receiver 500 of the UE 122 receives the first SIB. (Step S900). Note that the first SIB may be transmitted via the BCCH logical channel or another logical channel. The information necessary for acquisition of control information related to the MBS transmission may be information related to a Multicast Control Channel (MCCH) logical channel. The MCCH may be a point-to-multipoint downlink channel for transmitting MBS control information and/or MBS configuration information and/or MBS information for one or multiple Multicast Traffic Channel (MTCH) logical channels from the gNB 108 to the UE 122. The MTCH may be a point-to-multipoint downlink channel for transmitting data of the MBS from the gNB 108 to the UE 122. The MCCH may be a multicast control channel. The MTCH may be a multicast traffic channel. The MTCH may be used by the UE 122 only in a case that the UE 122 receives the MBS. Note that other terms may be used to refer to the MCCH, such as an MBS-MCCH and an NR-MCCH. Other terms may be used to refer to the MTCH, such as an MBS-MTCH and an NR-MTCH. The MCCH may be mapped to a Multicast Channel (MCH) being a downlink transport channel, or may be mapped to a Downlink Shared Channel (DL-SCH) being a downlink transport channel. The MTCH may be mapped to a Multicast Channel (MCH) being a downlink transport channel, or may be mapped to a Downlink Shared Channel (DL-SCH) being a downlink transport channel. The MBS control information and/or MBS configuration information and/or MBS information for one or multiple MTCH logical channels may be included in the SIB, or may be included in a second SIB other than the first SIB.

For example, the first SIB may include a part or all of parameters, such as a parameter indicating a period for which details of the MCCH may be changed, a parameter related to a transmission (retransmission) time interval of the MCCH, a parameter indicating an offset of the radio frame in which the MCCH is scheduled, a parameter indicating the subframe in which the MCCH is scheduled, and a parameter indicating a period of the subframe in which the MCCH is scheduled. Note that the parameter related to the transmission (retransmission) time interval of the MCCH may be represented by the number of radio frames.

Next, the processing unit of the gNB 108 may create an RRC message to be transmitted on the MCCH, and transmit the RRC message from the transmitter 600. The receiver 500 of the UE 122 may receive the RRC message transmitted on the MCCH, based on the configuration of the SIB. For the transmission of the MCCH, a dedicated Radio Network Temporary Identifier (RNTI) for identifying the MCCH transmission may be used. As a value of the dedicated RNTI for identifying the MCCH transmission, a specific value may be used or a value may be configured by the SIB (step S1302). In an embodiment of the present invention, a message name of MBS configuration information message is used to refer to the RRC message to be transmitted on the MCCH, but other message names may be used.

The MBS configuration information may include control information that can be applied to MBS reception. For example, the MBS configuration information may include a part or all of fields, such as a parameter related to information of the MBS session, a parameter indicating the RNTI for identifying a multicast group (MTCH addressed to a specific group), a parameter indicating a logical channel identifier, a parameter related to DRX information for the MTCH, and a parameter indicating a list of neighboring cells that provide the same MBS. For example, the parameter related to information of the MBS session may include a part or all of parameters, such as a parameter indicating a Temporary Mobile Group Identity (TMGI), described in NPL 15, which is an identifier for identifying the MBS (or MBMS) bearer service, a parameter indicating a Session ID, described in NPL 15 and the like, which is an identifier of the MBS (or MBMS) session, a parameter indicating the PDU session to which the MBS (or MBMS) bearer service and/or the MBS session belongs, and a parameter indicating the QoS flow used for the MBS (or MBMS) bearer service and/or the MBS session. A part or all of the MBS configuration information may be included in the first SIB, may be included in the second SIB, or may be included in a third SIB other than the first and second SIBs.

Note that a part or all of the multiple parameters included in the MBS configuration information may be included in a form of a list. The parameters included in the form of a list may be present for each MTCH (or each MBS service) in a cell in which the MCCH is transmitted. The parameter indicating the list of neighboring cells that provide the same MBS may include a parameter indicating a list of neighboring cells that provide the same MBS via the MTCH and/or the MRB, or may include a parameter indicating a list of neighboring cells that provide the same MBS via the unicast, and/or the DTCH, and/or the DRB. The parameter indicating the PDU session may be a PDU session ID described in NPL 2 and the like. The parameter indicating the PDU session and/or the parameter indicating the QoS flow may be included in the parameter indicating the SDAP configuration.

The MBS reception and/or transmission may be performed via the MRB. The MBS reception and/or transmission may be performed via the MRB for receiving and/or transmitting the MBS on a point-to-multipoint basis. The MBS reception and/or transmission may be performed via the MRB for receiving and/or transmitting the MBS on a point-to-point basis. The MBS transmission and/or transmission may be performed via the DRB. In the case that the MRB reception and/or transmission may be performed via the MRB for receiving and/or transmitting the MBS on a point-to-point basis, the reception and/or transmission may be performed via the DTCH. In the case that the MRB reception and/or transmission is performed via the DRB, the reception and/or transmission may be performed via the DTCH.

In order to initiate reception of the MBS session in which the processing unit 502 of the UE 122 is interested, the processing unit 502 may perform MRB establishment processing (Step S1304). For example, the MRB establishment processing may be started based on a case of initiating the MBS session, a case that the UE 122 enters a cell where the MBS service in which the UE 122 is interested is provided via the MRB, a case of starting to take an interest in the MBS service, a case that a restriction on UE capability that has restricted reception of the MBS service is removed, and the like. The MRB establishment processing may be performed in a case that the UE 122 is in the RRC_IDLE state, may be performed in a case that the UE 122 is in the RRC_INACTIVE state, or may be performed in a case that the UE 122 is in the RRC_CONNECTED state. In a case of performing the MRB establishment processing, the processing unit 502 of the UE 122 may perform a part or all of the following processing of (A) to (G). Note that the processing of (A) may be performed in a case that the UE 122 is in the RRC_CONNECTED state and/or the RRC_INACTIVE state. Note that the processing of (F) may be performed in a case that the UE 122 is in the RRC_CONNECTED state, or may be performed in a case that the UE 122 is in the RRC_CONNECTED state and/or the RRC_INACTIVE state. The processing of (F) may be performed in a case that the UE 122 has transitioned from the RRC_IDLE state and/or the RRC_INACTIVE state to the RRC_CONNECTED state:

(A) establish and/or configure the SDAP entity in a case that the SDAP entity is not present in the PDU session corresponding to the parameter indicating the PDU session included in the MBS configuration;

(B) establish the PDCP entity according to a default configuration related to MRB establishment or according to a configuration received from the base station;

(C) establish the RLC entity according to a default configuration related to MRB establishment or according to a configuration received from the base station;

(D) configure the MTCH logical channel to be applied to the MRB to be established according to a default configuration or according to a configuration received from the base station, and instruct the MAC entity so as to receive the MBS session desired to be received;

(E) configure the physical layer for the MRB to be established, based on the received MBS configuration;

(F) associate the SDAP entity and the established MRB;

(G) notify a higher layer of information including a part or all of a TMGI, a Session ID, a PDU session ID, and a QoS flow corresponding to the established MRB and thereby notify the higher layer of establishment of the MRB.

Note that the MRB may be an MRB for receiving and/or transmitting the MBS on a point-to-multipoint basis, or an MRB for receiving and/or transmitting the MBS on a point-to-point basis described above.

Note that, in step S1304 described above, the MRB establishment processing may be started based on receiving or having received an RRC message indicating establishing the MRB from the gNB 108. The MRB establishment processing may be started based on receiving or having received an RRC message including a part or all of session information of the MBS session of interest via the DCCH logical channel from the gNB 108. The MRB establishment processing may be started based on receiving or having received an RRC message including a part or all of session information of the MBS session of interest via the DCCH logical channel from the gNB 108, and based on that the MRB corresponding to the part or all of the session information of the MBS session of interest included in the RRC message is not established. The MRB establishment processing may be started based on initiating receiving the MBS on a point-to-multipoint basis. The MRB establishment processing may be started based on receiving an MBS establishment indication from the higher layer, an indication of initiating receiving the MBS on a point-to-multipoint basis, or the like. The RRC message indicating establishing the MRB may include a part or all of the session information of the MBS session. The part or all of the session information of the MBS session may be information including some or all of a TMGI, a Session ID, a PDU session ID, and a QoS flow corresponding to the MBS. The MRB establishment processing may be started based on receiving a control information element that means initiating receiving the MBS session of interest from the gNB 108. The control information element that means initiating receiving the MBS session of interest may include RNTI information and/or logical channel identifier used for receiving the MBS session of interest.

Note that, in step S1304 described above, MRB resume processing may be performed instead of the MRB establishment processing. The MRB resume processing may be processing for resuming the MRB that has been suspended. For example, the MRB resume processing may be started based on a case of initiating the MBS session, a case that the UE 122 enters a cell where the MBS service in which the UE 122 is interested is provided via the MRB, a case of starting to take an interest in the MBS service, a case that a restriction on UE capability that has restricted reception of the MBS service is removed, and the like. The MRB resume processing may be performed in a case that the UE 122 is in the RRC_IDLE state, may be performed in a case that the UE 122 is in the RRC_INACTIVE state, or may be performed in a case that the UE 122 is in the RRC_CONNECTED state. In performing the MRB resume processing, information including a part or all of a TMGI, a Session ID, a PDU session ID, and a QoS flow corresponding to the resumed MRB may be notified to the higher layer. Note that the MRB may be an MRB for receiving and/or transmitting the MBS on a point-to-multipoint basis, or an MRB for receiving and/or transmitting the MBS on a point-to-point basis described above.

Note that, in step S1304 described above, the MRB resume processing may be started based on receiving or having received an RRC message indicating resuming the MRB from the gNB 108. The MRB resume processing may be started based on receiving or having received an RRC message including a part or all of session information of the MBS session of interest via the DCCH logical channel from the gNB 108. The MRB resume processing may be started based on receiving or having received an RRC message including a part or all of session information of the MBS session of interest via the DCCH logical channel from the gNB 108, and based on that the MRB corresponding to the part or all of the session information of the MBS session of interest included in the RRC message is suspended. The MRB resume processing may be started based on initiating receiving the MBS on a point-to-multipoint basis. The MRB resume processing may be started based on receiving an MBS resume indication from the higher layer, an indication of initiating receiving the MBS on a point-to-multipoint basis, or the like. The RRC message indicating resuming the MRB may include a part or all of the session information of the MBS session. The part or all of the session information of the MBS session may be information including some or all of a TMGI, a Session ID, a PDU session ID, and a QoS flow corresponding to the MBS. The MRB resume processing may be started based on receiving a control information element that means initiating receiving the MBS session of interest from the gNB 108. The control information element that means initiating receiving the MBS session of interest may include RNTI information and/or logical channel identifier used for receiving the MBS session of interest.

The processing unit 502 of the UE 122 receives the MBS session via the established or resumed MRB according to the PTM configuration message (Step S1306). Before receiving the MBS session, the processing unit 502 of the UE 122 may create an RRC message for notifying the gNB 108 that the UE 122 is to receive or is interested in receiving the MBS service via the MRB, and transmit the RRC message from the transmitter 504 to the eNB 102 (not illustrated). Note that, in an embodiment of the present invention, a message name of MBS interest notification message (MBSInterestIndication) is used to refer to the RRC message for notifying the gNB 108 that the UE 122 is to receive or is interested in receiving the MBS service via the MRB, but other message names may be used. The MBS interest notification message may include information as to whether to prioritize MBS service reception over unicast reception. The MBS interest notification message may include, in a case that cells are moved from a cell in which the MBS service can be received via the MTCH and/or the MRB to a cell in which the MBS service cannot be received via the MTCH and/or the MRB but the same MBS service can be received via the DTCH and/or the DRB, information as to whether to receive the same MBS service via the DTCH and/or the DRB. The MBS interest notification message may include information as to whether to allow to receive the MBS via the DTCH and/or the DRB, and/or the MRB for receiving and/or transmitting the MBS on a point-to-point basis, or information similar thereto, in the cell capable of receiving the MBS service via the MTCH and/or the MRB. The MBS interest notification message may be transmitted after the SIB described in Step S1300 is received, in a case of transition to the RRC_CONNECTED state, or after transition to the RRC_CONNECTED state. The MBS interest notification message may be transmitted in a case that the SIB described in Step S1300 is received in handover, may be transmitted in a case that the SIB described in Step S1300 is received in re-establishment of the RRC connection, or may be transmitted in a case that the SIB described in Step S1300 is received in transition from the RRC_INACTIVE state to the RRC_CONNECTED state.

The processing unit 502 of the UE 122 may perform MRB release processing in order to stop reception of the MBMS session (Step S1308). For example, the MRB release processing may be started based on a case of stopping the MBS session being received, a case of leaving from a cell in which the MRB is established, a case of leaving from a cell in which the MBS service can be received using the MRB, a case that the interest in the MBS service is lost, a case that reception of the MBS service is restricted due to the restriction on the UE capability, and the like. The MRB release processing may be performed in a case that the UE 122 is in the RRC_IDLE state, may be performed in a case that the UE 122 is in the RRC_INACTIVE state, or may be performed in a case that the UE 122 is in the RRC_CONNECTED state. In a case of performing the MRB release processing, the processing unit 502 of the UE 122 may perform a part or all of the following processing of (A) to (D). Note that the following processing of (D) may be performed only in a case that the UE 122 is in the RRC_CONNECTED state and/or the RRC_INACTIVE state:

(A) release the PDCP entity of the MRB to be released;
(B) release a physical layer configuration with the RLC entity of the MRB to be released and the MAC related thereto;
(C) notify a higher layer of information including a part or all of a TMGI, a Session ID, a PDU session ID, and a QoS flow corresponding to the released MRB and thereby notify the higher layer of release of the MRB;
(D) release an SDAP entity among the SDAP entities in a case that the SDAP entity does not include an associated MRB and/or DRB.

Note that the MRB may be an MRB for receiving and/or transmitting the MBS on a point-to-multipoint basis, or an MRB for receiving and/or transmitting the MBS on a point-to-point basis described above.

Note that, in step S1308 described above, the MRB release processing may be started based on receiving or having received an RRC message indicating releasing the MRB from the gNB 108. The MRB release processing may be started based on receiving or having received an RRC message including a part or all of session information of the MBS session of interest via the DCCH logical channel from the gNB 108. The MRB release processing may be started based on receiving or having received an RRC message including a part or all of session information of the MBS session of interest via the DCCH logical channel from the gNB 108, and based on that the MRB corresponding to the part or all of the session information of the MBS session of interest included in the RRC message is established. The MRB release processing may be started based on initiating receiving the MBS on a point-to-point basis. The MRB release processing may be started based on receiving an MBS release indication from the higher layer, an indication of receiving the MBS on a point-to-point basis, or the like. The RRC message indicating releasing the MRB may include a part or all of the session information of the MBS session. The part or all of the session information of the MBS session may be information including some or all of a TMGI, a Session ID, a PDU session ID, and a QoS flow corresponding to the MBS. The MRB release processing may be started based on receiving a control information element that means stopping receiving the MBS session of interest from the gNB 108. The control information element that means stopping receiving the MBS session of interest may include RNTI information and/or logical channel identifier used for receiving the MBS session of interest.

Note that, in step S1308, MRB suspend processing may be performed instead of the MRB release processing. The MRB suspend processing may be processing for suspending the MRB. For example, the MRB suspend processing may be started based on a case of stopping the MBS session being received, a case of leaving from a cell in which the MRB is established, a case of leaving from a cell in which the MBS service can be received using the MRB, a case that the interest in the MBS service is lost, a case that reception of the MBS service is restricted due to the restriction on the UE capability, and the like. In performing the MRB suspend processing, the RLC entity of the MRB to be suspended may be reestablished. In performing the MRB suspend processing, the downlink reception may be stopped. In performing the MRB suspend processing, the PDCCH monitoring may be stopped. In performing the MRB suspend processing, information including a part or all of a TMGI, a Session ID, a PDU session ID, and a QoS flow corresponding to the suspended MRB may be notified to the higher layer. Note that the MRB may be an MRB for receiving and/or transmitting the MBS on a point-to-multipoint basis, or an MRB for receiving and/or transmitting the MBS on a point-to-point basis described above.

In step S1308 described above, the MRB suspend processing may be started based on receiving or having received an RRC message indicating suspending the MRB from the gNB 108. The MRB suspend processing may be started based on receiving or having received an RRC message including a part or all of session information of the MBS session of interest via the DCCH logical channel from the gNB 108. The MRB suspend processing may be started based on receiving or having received an RRC message including a part or all of session information of the MBS session of interest via the DCCH logical channel from the gNB 108, and based on a fact that the MRB corresponding to the part or all of the session information of the MBS session of interest included in the RRC message is not suspended. The MRB suspend processing may be started based on initiating receiving the MBS on a point-to-point basis. The MRB suspend processing may be started based on receiving an MBS suspend indication from the higher layer, an indication of receiving the MBS on a point-to-point basis, or the like. The RRC message indicating suspending the MRB may include a part or all of the session information of the MBS session. The part or all of the session information of the MBS session may be information including some or all of a TMGI, a Session ID, a PDU session ID, and a QoS flow corresponding to the MBS. The MRB suspend processing may be started based on receiving a control information element that means stopping receiving the MBS session of interest from the gNB 108. The control information element that means stopping receiving the MBS session of interest may include RNTI information and/or logical channel identifier used for receiving the MBS session of interest.

Note that, in an embodiment of the present invention, in a case that the UE 122 receives a message related to reconfiguration of RRC connection and the DRB is established, in other words, in a case that the DRB identity included in the message related to reconfiguration of RRC connection is not present in the configuration of the UE 122, the processing unit 502 of the UE 122 may notify a higher layer that user plane resources for the PDU session have been established, based on a case that the SDAP entity for the PDU session corresponding to a field indicated by pdu-session included in the message related to reconfiguration of RRC connection is present and a fact that the DRB that has been established or that is to be established is a first DRB for the SDAP entity and/or the PDU session. Note that the above case "that the SDAP entity for the PDU session corresponding to a field indicated by pdu-session is present and a case that the DRB that has been established or that is to be established is a first DRB for the SDAP entity and/or the PDU session" may be a case where the SDAP entity is the SDAP entity established in MRB establishment and the first DRB for the SDAP entity and/or the PDU session is to be established or has been established.

In an embodiment of the present invention, the UE 122 may receive a message related to reconfiguration of RRC connection and perform processing related to configuration of a radio bearer, and then based on a fact that an SDAP entity not including an associated DRB is present among the SDAP entities, the UE 122 may notify a higher layer that user plane resources for the SDAP entity not including an associated DRB have been released. In an embodiment of the present invention, the UE 122 may receive a message related to reconfiguration of RRC connection and perform processing related to configuration of a radio bearer, and then based on a fact that an SDAP entity not including an associated DRB and/or MRB is present among the SDAP entities, the UE 122 may release the SDAP entity not including an associated DRB and/or MRB.

In this manner, in an embodiment of the present invention, the UE 122 can efficiently receive the MBS by using NR.

The radio bearer in the above description may be a DRB, may be an SRB, may be an MRB, may be a DRB and an SRB, may be a DRB and an MRB, may be an SRB and an MRB, or may be a DRB and an SRB and an MRB.

In the above description, expressions such as "linked", "mapped", and "associated" may be replaced with each other.

In the example of each processing or the example of the flow of each processing in the above description, a part or all of the steps need not be performed. In the example of each processing or the example of the flow of each processing in the above description, order of the steps may be different. In the example of each processing or the example of the flow of each processing in the above description, a part or all of the processing in each step need not be performed. In the example of each processing or the example of the flow of each processing in the above description, order of processing in each step may be different. In the above description, "to perform B based on satisfaction of A" may be interpreted as "to perform B". In other words, "to perform B" may be performed independently of "satisfaction of A".

Note that in the above description, "A may be interpreted as B" may include the meaning that B is interpreted as A in addition to interpretation of A as B. In a case that the above description contains "C may be D" and "C may be E," this means inclusion of "D may be E." In a case that the above description contains "F may be G" and "G may be H," this means inclusion of "F may be H."

In the above description, in a case that a condition "A" and a condition "B" are conflicting conditions, the condition "B" may be expressed as "other" condition of the condition "A".

Various aspects of the terminal apparatus according to embodiments of the present invention will be described below.

(1) An aspect of an embodiment of the present invention is a terminal apparatus for communicating with a base station apparatus, the terminal apparatus being configured to release, based on receiving, via a DCCH from the base station apparatus, an RRC message including a part of session information of an MBS session, an MBS radio bearer used to receive the MBS session.

(2) An aspect of an embodiment of the present invention is a terminal apparatus for communicating with a base station apparatus, the terminal apparatus being configured to release, based on receiving an MBS session on a point-to-point basis, an MBS radio bearer used to receive the MBS session.

(3) An aspect of an embodiment of the present invention is a base station apparatus for communicating with a terminal apparatus, the base station apparatus being configured to cause the terminal apparatus to release, based on transmitting, via a DCCH to the terminal apparatus, an RRC message including a part of session information of an MBS session, an MBS radio bearer used to receive the MBS session.

(4) An aspect of an embodiment of the present invention is a method for a terminal apparatus for communicating with a base station apparatus, the method including releasing, based on receiving, via a DCCH from the base station apparatus, an RRC message including a part of session information of an MBS session, an MBS radio bearer used to receive the MBS session.

(5) An aspect of an embodiment of the present invention is a method for a terminal apparatus for communicating with a base station apparatus, the method including releasing, based on receiving an MBS session on a point-to-point basis, an MBS radio bearer used to receive the MBS session.

(5) An aspect of an embodiment of the present invention is a method for a base station apparatus for communicating with a terminal apparatus, the method including causing the terminal apparatus to release, based on transmitting, via a DCCH to the terminal apparatus, an RRC message including a part of session information of an MBS session, an MBS radio bearer used to receive the MBS session.

A program running on an apparatus according to an aspect of the present invention may serve as a program that controls a Central Processing Unit (CPU) and the like to cause a computer to operate in such a manner as to implement the functions of the above-described embodiments according to the aspect of the present invention. Programs or the information handled by the programs are temporarily loaded into a volatile memory such as a Random Access Memory (RAM) while being processed, or stored in a non-volatile memory such as a flash memory, or a Hard Disk Drive (HDD), and then read, modified, and written by the CPU, as necessary.

Note that the apparatuses in the above-described embodiments may be partially enabled by a computer. In such a case, a program for realizing such control functions may be recorded on a computer-readable recording medium to cause a computer system to read the program recorded on the recording medium to perform the program. It is assumed that the "computer system" mentioned here refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, and the like.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the above-described program may be configured to realize some of the functions described above, and additionally may be configured to realize the functions described above, in combination with a program already recorded in the computer system.

Furthermore, each functional block or various characteristics of the apparatuses used in the above-described embodiments may be implemented or performed with an electric circuit, that is, typically an integrated circuit or multiple integrated circuits. An electric circuit designed to perform the functions described in the present specification may include a general purpose processor, a digital signal processor (DSP), an application specific integrated circuit (ASIC), a field programmable gate array (FPGA), or other programmable logic devices, discrete gates or transistor logic, discrete hardware components, or a combination thereof. The general-purpose processor may be a microprocessor, or the processor may be a processor of known type, a controller, a micro-controller, or a state machine instead. The general-purpose processor or the above-mentioned circuits may include a digital circuit, or may include an analog circuit. Furthermore, in a case that with advances in semiconductor technology, a circuit integration technology appears that replaces the present integrated circuits, it is also possible to use an integrated circuit based on the technology.

Note that the invention of the present application is not limited to the above-described embodiments. Although apparatuses have been described as an example in the embodiment, the invention of the present application is not limited to these apparatuses, and is applicable to a stationary type or a non-movable type electronic apparatus installed indoors or outdoors such as a terminal apparatus or a communication apparatus, for example, an AV device, a kitchen device, a cleaning or washing machine, an air-conditioning device, office equipment, a vending machine, and other household appliances.

Although, the embodiments of the present invention have been described in detail above referring to the drawings, the specific configuration is not limited to the embodiments and includes, for example, design changes within the scope that does not depart from the gist of the present invention. For an aspect of the present invention, various modifications are possible within the scope of the claims, and embodiments that are made by suitably combining technical means disclosed according to the different embodiments are also included in the technical scope of the present invention. A configuration in which components, which are described in the embodiment described above, having similar effects are interchanged is also included in the present invention.

INDUSTRIAL APPLICABILITY

An aspect of the present invention can be utilized, for example, in a communication system, communication equipment (for example, a cellular phone apparatus, a base station apparatus, a wireless LAN apparatus, or a sensor device), an integrated circuit (for example, a communication chip), or a program.

REFERENCE SIGNS LIST

100 E-UTRA
102 eNB
104 EPC
106 NR
108 gNB
110 5GC
112, 114, 116, 118, 120, 124 Interface
122 UE
200, 300 PHY
202, 302 MAC
204, 304 RLC
206, 306 PDCP
208, 308 RRC
310 SDAP
210, 312 NAS
500, 604 Receiver
502, 602 Processing unit
504, 600 Transmitter

The invention claimed is:

1. A terminal apparatus for communicating with a base station apparatus, wherein
   the terminal apparatus is configured to release a Packet Data Convergence Protocol (PDCP) entity of a Multicast Broadcast Service (MBS) Radio Bearer (MRB) for receiving an MBS on a Point-to-Point basis after receiving, from the base station, via a Dedicated Control Channel (DCCH), a Radio Resource Control (RRC) message including a session identity (ID) of the MBS, the RRC message indicating to the terminal apparatus to release the MRB corresponding to the session ID.

2. A base station apparatus for communicating with a terminal apparatus, wherein
   the base station apparatus is configured to cause the terminal apparatus to release a Packet Data Convergence Protocol (PDCP) entity of a Multicast Broadcast Service (MBS) Radio Bearer (MRB) for transmitting an MBS on a Point-to-Point basis after transmitting, to the terminal apparatus, via a Dedicated Control Channel (DCCH), a Radio Resource Control (RRC) message including a session identity (ID) of the MBS, the RRC message indicating to the terminal apparatus to release the MRB corresponding to the session ID.

3. A method performed by a terminal apparatus for communicating with a base station apparatus, the method comprising:
   releasing a Packet Data Convergence Protocol (PDCP) entity of a Multicast Broadcast Service (MBS) Radio Bearer (MRB) for receiving an MBS on a Point-to-Point basis after receiving, from the base station, via a Dedicated Control Channel (DCCH), a Radio Resource Control (RRC) message including a session identity (ID) of the MBS, the RRC message indicating to the terminal apparatus to release the MRB corresponding to the session ID.

* * * * *